(12) United States Patent
Saida et al.

(10) Patent No.: US 7,437,513 B2
(45) Date of Patent: Oct. 14, 2008

(54) CACHE MEMORY WITH THE NUMBER OF OPERATED WAYS BEING CHANGED ACCORDING TO ACCESS PATTERN

(75) Inventors: Yasumasa Saida, Minato-ku (JP); Hiroaki Kobayashi, 2-6-10, Takamatsu, Aoba-ku, Sendai-shi, Miyagi 981-0907 (JP)

(73) Assignees: NEC Corporation, Tokyo (JP); Hiroaki Kobayashi, Miyagi (JP)

( * ) Notice: Subject to any disclaimer, the term of this patent is extended or adjusted under 35 U.S.C. 154(b) by 716 days.

(21) Appl. No.: 11/116,232

(22) Filed: Apr. 28, 2005

(65) Prior Publication Data

US 2005/0246499 A1 Nov. 3, 2005

(30) Foreign Application Priority Data

Apr. 30, 2004 (JP) ............................. 2004-135686

(51) Int. Cl.
G06F 12/08 (2006.01)
(52) U.S. Cl. ..................... 711/128; 711/129; 711/136; 711/145
(58) Field of Classification Search .................. 711/128, 711/129, 122, 141, 137, 133, 144, 145, 136
See application file for complete search history.

(56) References Cited

U.S. PATENT DOCUMENTS 5,761,715 A * 6/1998 Takahashi .................... 711/128
5,918,245 A * 6/1999 Yung ........................... 711/122
6,138,209 A * 10/2000 Krolak et al. ................ 711/128

(Continued)

FOREIGN PATENT DOCUMENTS

JP 1-290051 A 11/1989

(Continued)

OTHER PUBLICATIONS

Scheme for Producing Miss-Rate as a Function of Cache Size by Means of Traces Produced by Observing Misses From a Cache of Fixed Size, IBM Technical Disclosure Bulletin, IBM Corp., vol. 33, No. 11, pp. 36-39, Apr. 1, 1991.*

*Primary Examiner*—Pierre-Michel Bataille
(74) *Attorney, Agent, or Firm*—Sughrue Mion, PLLC

(57) ABSTRACT

An improvement in performance and a reduction of power consumption in a cache memory can both be effectively realized by increasing or decreasing the number of operated ways in accordance with access patterns. A hit determination unit determines the hit way when a cache access hit occurs. A way number increase/decrease determination unit manages, for each of the ways that are in operation, the order from the way for which the time of use is most recent to the way for which the time of use is oldest. The way number increase/decrease determination unit then finds the rank of the hit ways that have been obtained in the hit determination unit and counts the number of hits for each rank in the order. The way number increase/decrease determination unit further determines increase or decrease of the number of operated ways based on the access pattern that is indicated by the relation of the number of hits to each rank in the order. A way number control unit then selects operation or halt of operation for each way in accordance with the determination to increase or decrease the number of operated ways.

46 Claims, 19 Drawing Sheets

U.S. PATENT DOCUMENTS

| | | | |
|---|---|---|---|
| 6,681,297 B2 * | 1/2004 | Chauvel et al. | 711/130 |
| 7,127,560 B2 * | 10/2006 | Cohen et al. | 711/129 |
| 2003/0084247 A1 * | 5/2003 | Song et al. | 711/128 |

FOREIGN PATENT DOCUMENTS

| JP | H05-020193 A | 1/1993 |
|---|---|---|
| JP | 2554449 B2 | 8/1996 |
| JP | H08-241208 A | 9/1996 |
| JP | 9-50401 A | 2/1997 |
| JP | H09-050401 A | 2/1997 |
| JP | 2000-020396 A | 1/2000 |
| JP | 2000-298618 A | 10/2000 |
| JP | 2002-049529 A | 2/2002 |
| JP | 2002-182980 A | 6/2002 |
| JP | 2002-236616 A | 8/2002 |
| JP | 2003-131945 A | 5/2003 |

* cited by examiner

CACHE MEMORY WITH THE NUMBER OF OPERATED WAYS BEING CHANGED ACCORDING TO ACCESS PATTERN

BACKGROUND OF THE INVENTION

1. Field of the Invention

The present invention relates to a set-associative cache memory, and more particularly to a cache control that is configured to enable dynamic control of the cache capacity that is caused to operate.

2. Description of the Related Art

In microprocessors in recent years, the capacity of a cache memory that is mounted on a chip has been increasing rapidly to improve performance. As a consequence, of the power consumed by a microprocessor, the proportion that is consumed by the cache memory is also expanding rapidly.

On the other hand, programs that are executed by microprocessors have a wide variety of characteristics, and the capacity of the cache memory that is required by the characteristics of these programs also varies. Thus, not all programs will require all of the cache memory that is on a chip. Methods have therefore been proposed for reducing the power consumption of the microprocessor by controlling the capacity of cache memory such that only the necessary capacity of cache memory is caused to function and the remaining cache memory is halted.

As a typical configuration of cache memory, the set-associative system is in wide use. In the set-associative system, the cache memory is divided into a plurality of units called "ways," tags and data being stored in each way. In such a configuration, controlling the number of ways that are caused to function enables control of the capacity of the cache memory. In other words, only the necessary number of ways is caused to function, and the supply of power or clocks may be halted to the other ways.

As a method of controlling the number of ways that are caused to operate in such cases, methods have been proposed in which the number of ways is controlled based on the cache miss rate (for example, refer to Japanese Patent Laid-Open Publication No. H9-50401). According to Japanese Patent Laid-Open Publication No. H9-50401, the cache miss rate is measured, the number of ways that are necessary is determined based on change in the cache miss rate, and the increase or decrease of the number of ways thus determined. Because the capacity of cache memory that is operated is dynamically controlled, power consumption in the cache memory can be more greatly reduced than when constantly operating all of the cache memory.

Alternatively, a cache system has also been proposed for improving the performance of cache memory by adopting a configuration that accords with the nature of a program. In this system, the optimum block configuration is determined during compilation, and this configuration then used during execution (for example, refer to Japanese Patent Laid-Open Publication No. 2000-20396).

However, the above-described prior art has the following problems:

The cache memory control method of the prior art such as is proposed in Japanese Patent Laid-Open Publication No. H9-50401 determines increase or decrease of the capacity of cache memory in accordance with the cache miss rate. However, the measured cache miss rate in some cases does not necessarily indicate the degree to which increasing cache capacity will bring about a reduction of the cache miss rate or the degree to which decreasing the cache capacity will affect the cache miss rate.

The access patterns of programs include patterns exhibiting a tendency to repeatedly and frequently access the same addresses or a tendency to access a variety of different addresses.

FIG. 1 presents graphs showing the access patterns of programs, FIG. 1A showing an access pattern in which the same addresses are repeatedly and frequently accessed, and FIG. 1B showing an access pattern in which a variety of different addresses are accessed. In FIG. 1, the LRU (Least Recently Used) state value indicates the degree of access to recently accessed ways, a lower value indicating a more recent access.

As shown in FIG. 1B, increasing the number of ways is effective when the cache miss rate is high in a program having a tendency to access a variety of different addresses. In contrast, in a program having a tendency to repeatedly and frequently access the same addresses as shown in FIG. 1A, the probability of access hits is low in ways having a low access frequency, and as a result, a further increase in the number of operated ways in response to a high cache miss rate will have little effect on decreasing the cache miss rate. In the cache memory control method of the prior art, control is implemented for increasing the number of ways even when this increase will have little effect on decreasing the cache miss rate.

Although a typical program exhibits a tendency (access pattern) in which cache access behaves with a certain degree of uniformity, because a program is made up of a combination of a variety of processes, the program will at times also exhibit behavior that diverges from the access pattern. In the cache memory control method of the prior art, when the cache miss rate changes due to this temporary behavior, the cache capacity was varied in accordance with these changes. However, changing the cache capacity in accordance with temporary behavior will result in a shortage or surplus of cache capacity when the behavior reverts to the original access pattern.

Thus, in the cache memory control methods of the prior art, it has been difficult to implement optimum control of the cache memory capacity that both improves cache performance and effectively reduces power consumption.

A prior-art cache system such as the one proposed in Japanese Patent Laid-Open Publication No. 2000-20396 includes cases in which the cache configuration is selected during compilation of the program. However, because the actual execution path is not known at the time of compilation, it is difficult to predict by static analysis the optimum cache configuration of the program during execution, and the system of Patent Laid-Open Publication No. 2000-20396 therefore may not be able to provide the optimum cache configuration of a program during execution and thus cannot improve cache performance.

SUMMARY OF THE INVENTION

It is an object of the present invention to provide a cache memory that, in cache memory control that is configured to allow dynamic control of the capacity that is operated, effectively allows both an improvement in performance and a reduction of power consumption, and further, to provide the control method of such a cache memory.

To achieve the above-described objects, the cache memory of the present invention is a set-associative cache memory and includes: a plurality of ways, a hit determination unit, a way number increase/decrease determination unit and a way number control unit.

The plurality of ways can each be selectively operated or halted.

The hit determination unit determines hit ways for which cache access hits have occurred.

The way number increase/decrease determination unit manages, for each of the ways that are being operated, the order of the ways beginning from the way for which the time of use is most recent to the way for which the time of use is oldest. The way number increase/decrease determination unit then finds the order of the hit ways that have been obtained in the hit determination unit, and counts the number of hits for each rank of the order. The way number increase/decrease determination unit further determines increase or decrease in the number of operated ways based on the access pattern that is indicated by the relation between the number of hits for each of the ranks of the order.

The way number control unit selects operation or halting of operation for each of the ways according to the determination of increase or decrease of the number of operated ways.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Explanation next regards the details of the first embodiment of the present invention with reference to the accompanying figures.

Figure 2:
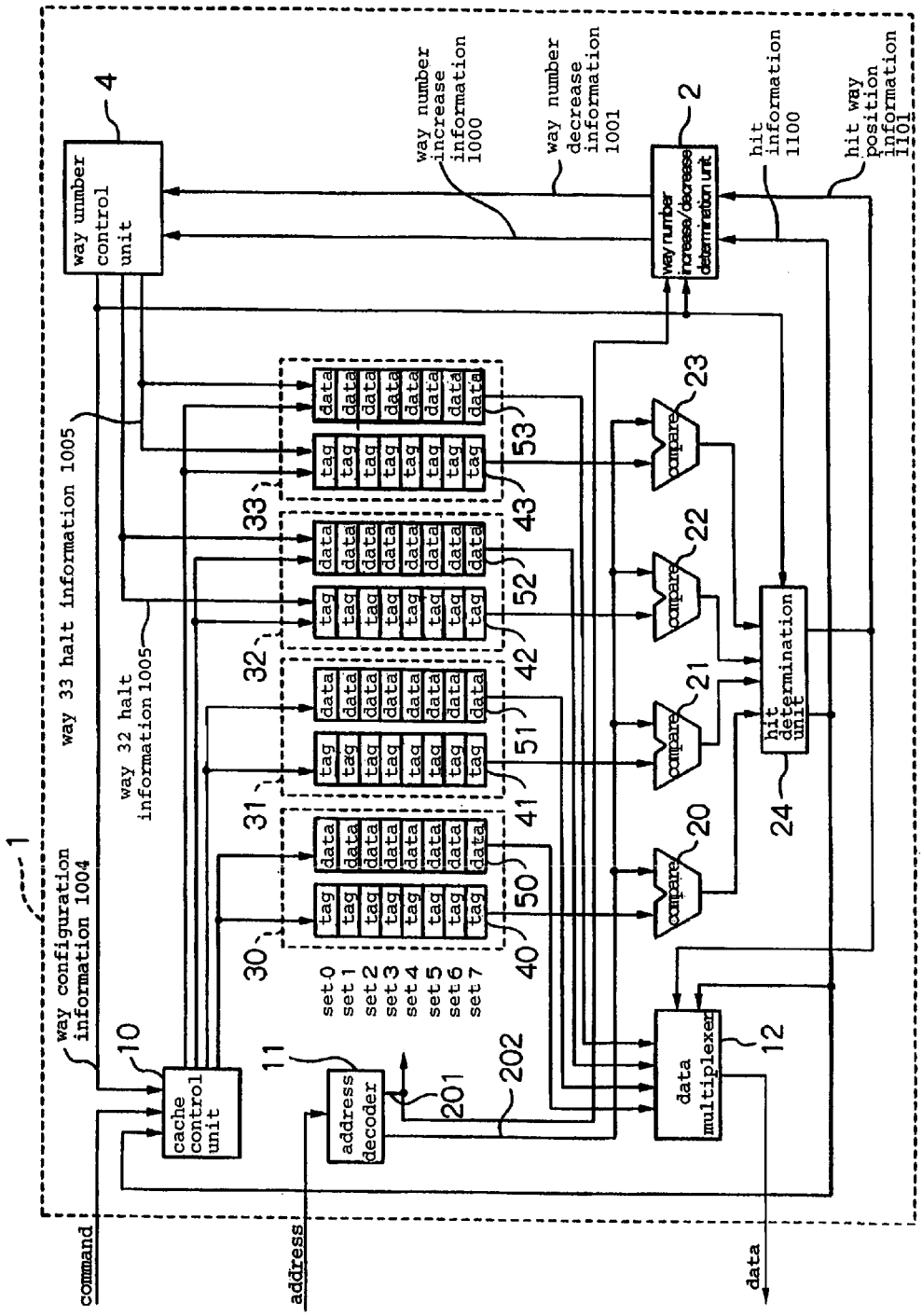
FIG. 2 is a block diagram showing the cache configuration of the first embodiment.

FIG. 2 is a block diagram showing the cache configuration of the first embodiment. In the present embodiment, the cache memory is configured as a set-associative cache of four ways that allows control of operation or termination for each way. Halting the operation of each way by means of this control enables a reduction of power consumption.

Referring to FIG. 2, the cache configuration of this embodiment includes: ways 30-33, cache control unit 10, address decoder 11, data multiplexer 12, address comparators 20-23, hit determination unit 24, way number increase/decrease determination unit 2, and way number control unit 4.

Each of ways 30-33 is a construction that includes a tag memory for storing addresses and a data memory for storing data. Way 30 is provided with tag memory 40 and data memory 50. Way 31 is provided with tag memory 41 and data memory 51. Way 32 is provided with tag memory 42 and data memory 52. Way 33 is provided with tag memory 43 and data memory 53. In the present embodiment, the number of cache sets is eight, and the size of blocks of data that are stored in data memory is four bytes.

Cache control unit 10, upon being supplied with a command from the outside such as a read or write command, sends this information to tag memories 40-43 and data memories 50-53 of each of ways 30-33.

Figure 3:
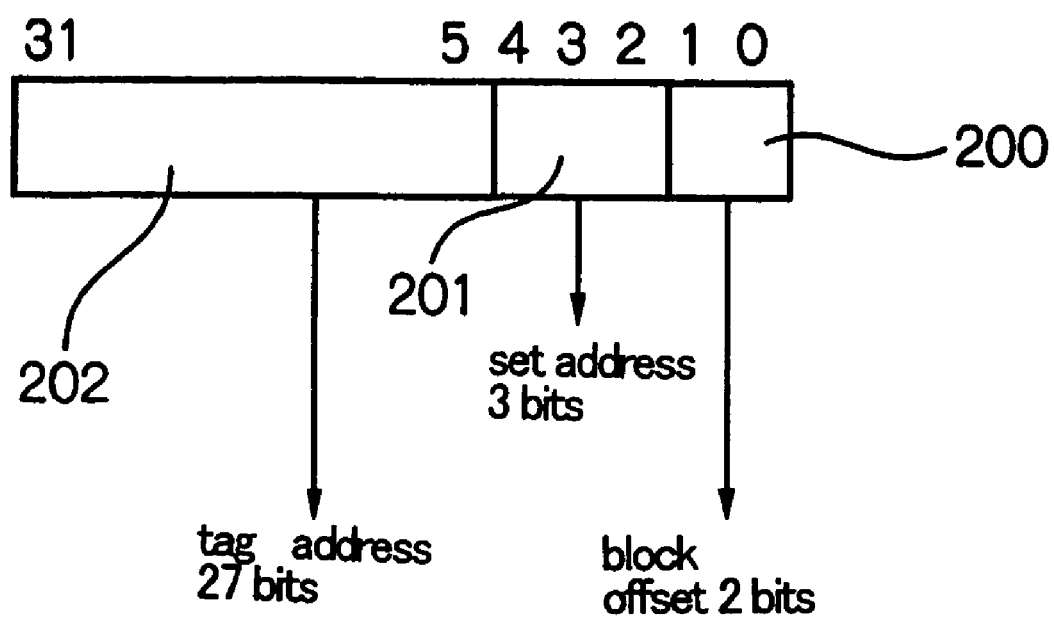
FIG. 3 shows the composition of an address that is supplied from the outside.

An address is supplied to address decoder 11 from the outside. FIG. 3 is a figure showing the configuration of an address that is supplied from the outside. In this present embodiment, an address is assumed to have a width of 32 bits. Referring to FIG. 3, an address is composed of block offset 200, set address 201, and tag address 202.

Block offset 200 is information that indicates the size of the data that are stored in the data memory. Since the block size is four bytes in the present embodiment, block offset 200 is 2 bits.

Set address 201 is information that indicates the set in which the data of the address for which access has occurred may be stored. Since the number of sets is eight in the present embodiment, set address 201 is 3 bits. Tag address 202 is information of 27 bits that excludes block offset 200 and set address 201 from the address. Tag address 202 is stored in a tag memory.

Address decoder 11, when supplied with an address from the outside, finds set address 201 and tag address 202 that correspond to the address, sends this set address 201 to each of ways 30-33 and way number increase/decrease determination unit 2, and sends tag address 202 to address comparators 20-23.

Ways 30-33 send to address comparators 20-23 the tag address that is stored in the tag memory that corresponds to the set that is designated by set address 201 from address decoder 11, and send to data multiplexer 12 the data that are stored in the data memory that corresponds to this set. A tag address from tag memory 40 of way 30 is sent to address comparator 20, a tag address from tag memory 41 of way 31 is sent to address comparator 21, a tag address from tag memory 42 of way 32 is sent to address comparator 22, and a tag address from tag memory 43 of way 33 is sent to address comparator 23.

Address comparator 20 determines whether the tag address from tag memory 40 matches with tag address 202 from address decoder 11 and sends the results of this determination to hit determination unit 24. If a match is determined, the data of the address for which access occurred from the outside are stored in data memory 50. On the other hand, if a match does not occur, the data of the address for which access occurred are not stored in data memory 50.

Address comparator 21 similarly determines whether the tag address from tag memory 41 matches tag address 202 from address decoder 11 and sends the result of determination to hit determination unit 24. Address comparator 22 determines whether the tag address from tag memory 42 matches tag address 202 from address decoder 11, and sends the determination result to hit determination unit 24. Address comparator 23 determines whether the tag address from tag memory 43 matches tag address 202 from address decoder 11 and sends the determination result to hit determination unit 24.

Hit determination unit 24 determines cache hits and cache misses based on the determination results that have been obtained by address comparators 20-23. A match obtained in any of address comparators 20-23 is a cache hit. Failure to match in all of address comparators 20-23 is a cache miss. Hit determination unit 24 sends hit information 1100 that indicates a cache hit or cache miss to cache control unit 10, data multiplexer 12, and way number increase/decrease determination unit 2. Further, in the event of a cache hit, hit determination unit 24 sends hit way position information 1101 that indicates the way that was hit (the hit way) to data multiplexer 12 and way number increase/decrease determination unit 2.

Data multiplexer 12 selects data from the data memory of the way that was hit based on hit information 1100 and hit way position information 1101 from hit determination unit 24 and supplies the selected data to the outside.

Way number increase/decrease determination unit 2 analyzes the access pattern of the program being executed based on the hit information 1100 and hit way position information 1101 from hit determination unit 24. Way number increase/decrease determination unit 2 further determines whether to increase, maintain, or decrease the number of ways that are operated (hereinbelow, referred to as the "number of operated ways") in the access pattern that has been obtained by analysis.

When increasing the number of operated ways, way number increase/decrease determination unit 2 next sends way number increase information 1000 to way number control unit 4, and when decreasing the number of operated ways, way number increase/decrease determination unit 2 sends way number decrease information 1001 to way number control unit 4.

Figure 4:
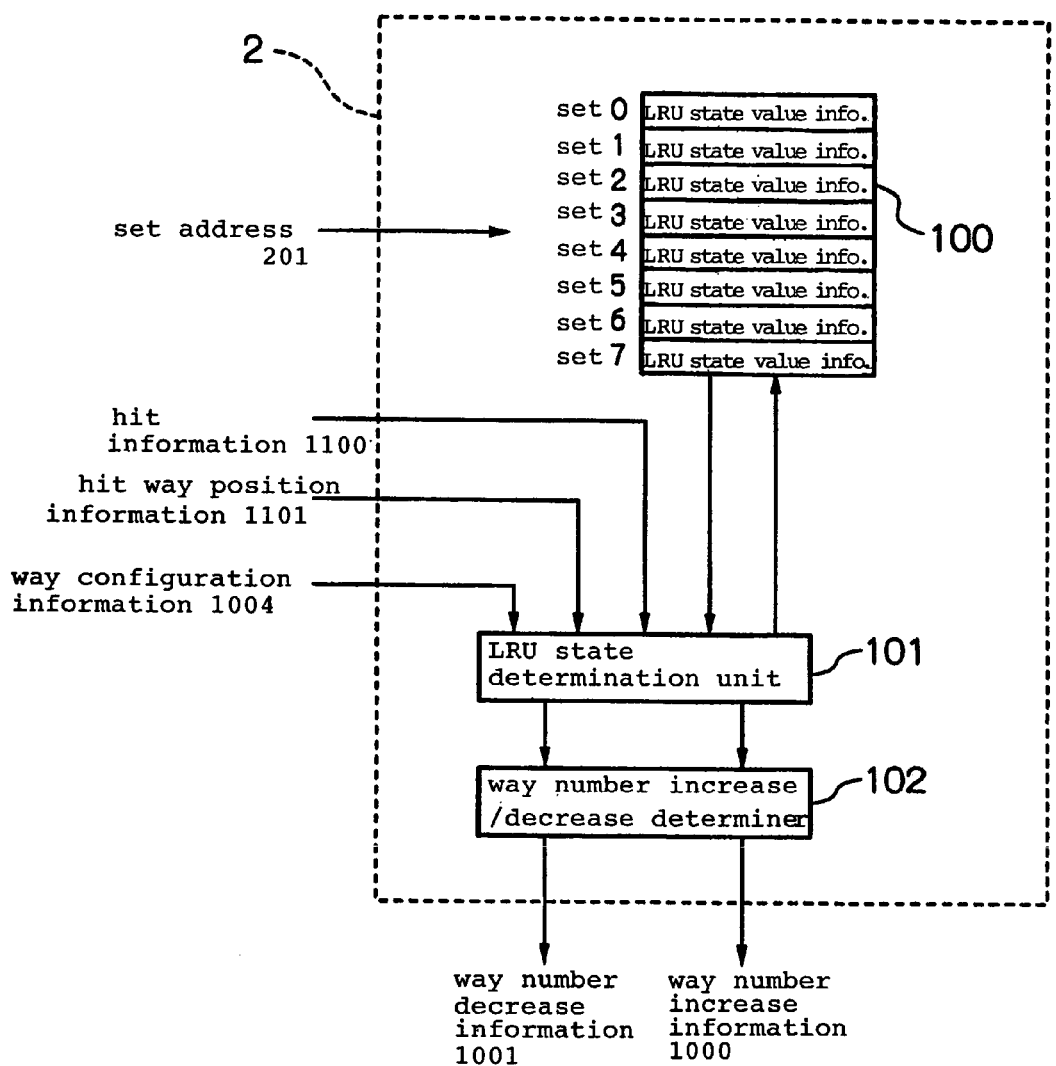
FIG. 4 is a block diagram showing the way number increase/decrease determination unit of the first embodiment.

FIG. 4 is a block diagram showing the configuration of the way number increase/decrease determination unit of the first embodiment. Referring to FIG. 4, way number increase/decrease determination unit 2 includes: LRU state value holding unit 100, LRU state determination unit 101, and way number increase/decrease determiner 102.

LRU state value holding unit 100 stores LRU state value information in accordance with each of eight sets. The LRU state value information includes LRU state values of the entries of each of the four ways.

Smaller LRU state values indicate that the entries have been more recently used, and larger LRU state values indicate that the entries have not been used for longer time intervals. In other words, the entry having the smallest LRU state value is the MRU (Most Recently Used) entry, and the entry having the largest LRU state value is the LRU entry. Referring to this LRU state value clearly indicates the frequency of use of entries for which access has occurred.

Figure 5:
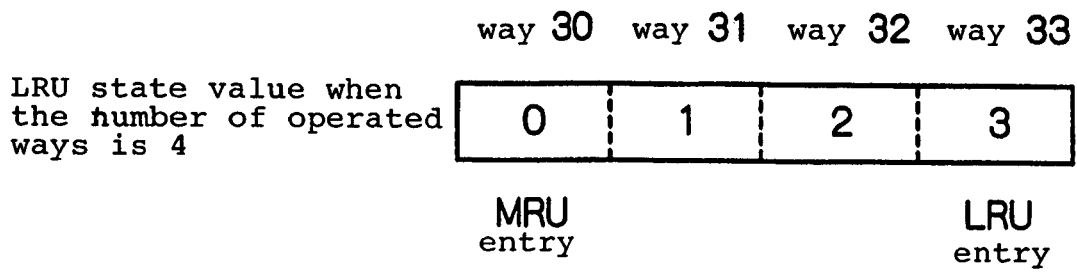
FIG. 5A shows an example of LRU state value information when the number of operated ways is 4.
FIG. 5B shows an example of LRU state value information when the number of operated ways is 3.
FIG. 5C shows an example of LRU state value information when the number of operated ways is 2.
Figure 5B:
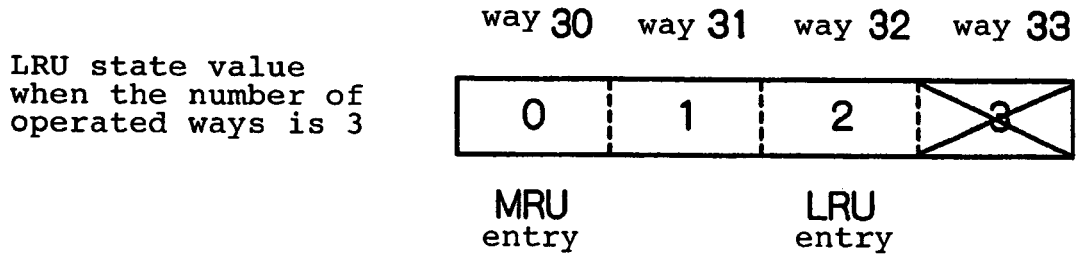
Figure 5C:
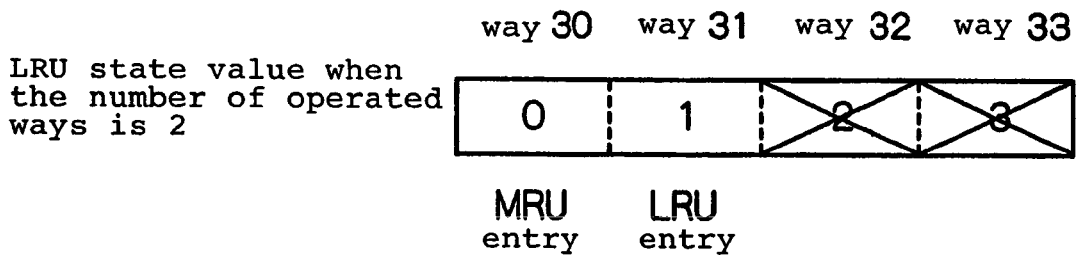

FIG. 5 shows an example of LRU state value information. As shown in FIG. 5A, when the number of operated ways is 4, the entry of way 30, for which the LRU state value is 0, is the MRU entry, and the entry of way 33, for which the LRU state value is 3, is the LRU entry. As shown in FIG. 5B, when the number of operated ways is 3, the entry of way 30, for which the LRU state value is 0, is the MRU entry, and the entry of way 32, for which the LRU state value is 2, is the LRU entry. As shown in FIG. 5C, when the number of operated ways is 2, the entry of way 30, for which the LRU state value is 0, is the MRU entry, and the entry of way 31, for which the LRU state value is 1, is the LRU entry. The number of operated ways can be learned from way configuration information 1004 from way number control unit 4. Way configuration information 1004 is information indicating the number of operated ways.

At the time of a cache hit, LRU state determination unit 101 determines, based on hit information 1100 and hit way position information 1101 from hit determination unit 24, way configuration information 1004 from way number control unit 4, and LRU state value information from LRU state value holding unit 100, whether the entry that is accessed is the LRU entry, the MRU entry, or another entry, and sends this determination result to way number increase/decrease determiner 102.

Way number increase/decrease determiner 102 determines whether the number of operated ways should be increased, sustained, or decreased based on the determination results of LRU state determination unit 101 and sends way number increase information 1000 or way number decrease information 1001 to way number control unit 4.

The following explanation regards the basic determination method in way number increase/decrease determiner 102.

Figure 1A:
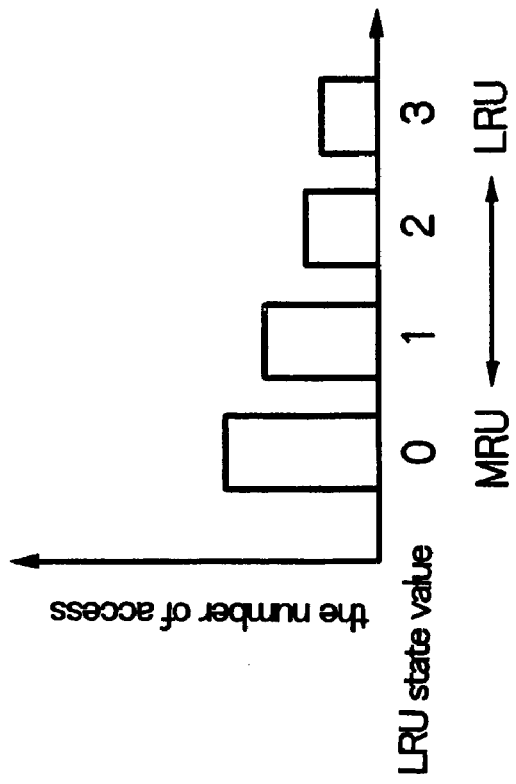
FIG. 1A shows a graph showing an access pattern in which the same addresses are repeatedly and frequently accessed.
Figure 1B:
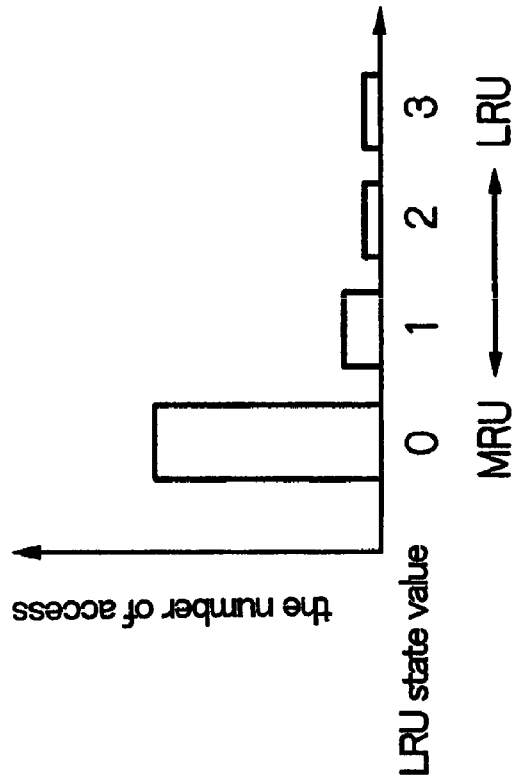
FIG. 1B shows a graph showing an access pattern in which a variety of different addresses are accessed.

In an access pattern in which access to the MRU entry is concentrated as shown in FIG. 1A, increasing the number of ways contributes little to improving performance (cache hit rate) and decreasing the number of ways has little affect on performance. Way number increase/decrease determiner 102 therefore determines to decrease the number of operated ways. On the other hand, in an access pattern in which access is comparatively uniform from the MRU entry to the LRU entry such as shown in FIG. 1B, increasing the number of ways contributes to an improvement in performance while decreasing the number of ways reduces performance, and way number increase/decrease determiner 102 therefore determines to increase the number of operated ways.

Way number increase/decrease determiner 102 uses appraisal function D shown by Formula (1) in the analysis of the access pattern to determine increase or decrease of the number of ways.

$$D = \text{(the number of accesses to the LRU entry)} / \text{(the number of accesses to the MRU entry)} \qquad (1)$$

In an access pattern in which access to the MRU is concentrated as shown in FIG. 1A, the value of appraisal function D is small. On the other hand, in an access pattern in which access is comparatively uniform from the MRU to the LRU such as shown in FIG. 1B, the value of appraisal function D is large. In other words, appraisal function D can be said to indicate the characteristic of the access pattern of the program that is being executed.

In this case, threshold values T1 and T2 are used in the determination of the access pattern using appraisal function D. Threshold values T1 and T2 are in the relation: T1<T2.

Way number increase/decrease determiner 102 determines an access pattern in which access is concentrated in the MRU entry if appraisal function D does not attain threshold value T1, i.e., if D<T1, and way number increase/decrease determiner 102 therefore sends way number decrease information 1001 to way number control unit 4. On the other hand, way number increase/decrease determiner 102 determines an access pattern in which access is comparatively uniform from the MRU entry to the LRU entry if appraisal function D is greater than threshold value T2, i.e., if D>T2, and way number increase/decrease determiner 102 therefore sends way number increase information 1000 to way number control unit 4. Way number increase/decrease determiner 102 sends neither way number increase information 1000 nor way number decrease information 1001 if appraisal function D is equal to or greater than threshold value T1 and equal to or less than threshold value T2, i.e., if T1≦D≦T2. The use of two threshold values T1 and T2 in this way enables appropriate selection according to the access pattern by independent threshold values for increase and decrease. In this way, a state in which the number of operated ways should be increased, a state in which the number of operated ways should be decreased, and an intermediate state in which the number of operated ways is maintained can be appropriately selected in accordance with the access pattern.

Explanation next regards the configuration of way number increase/decrease determiner 102 and the actual operation when determining increase or decrease of the number of ways.

Figure 6:
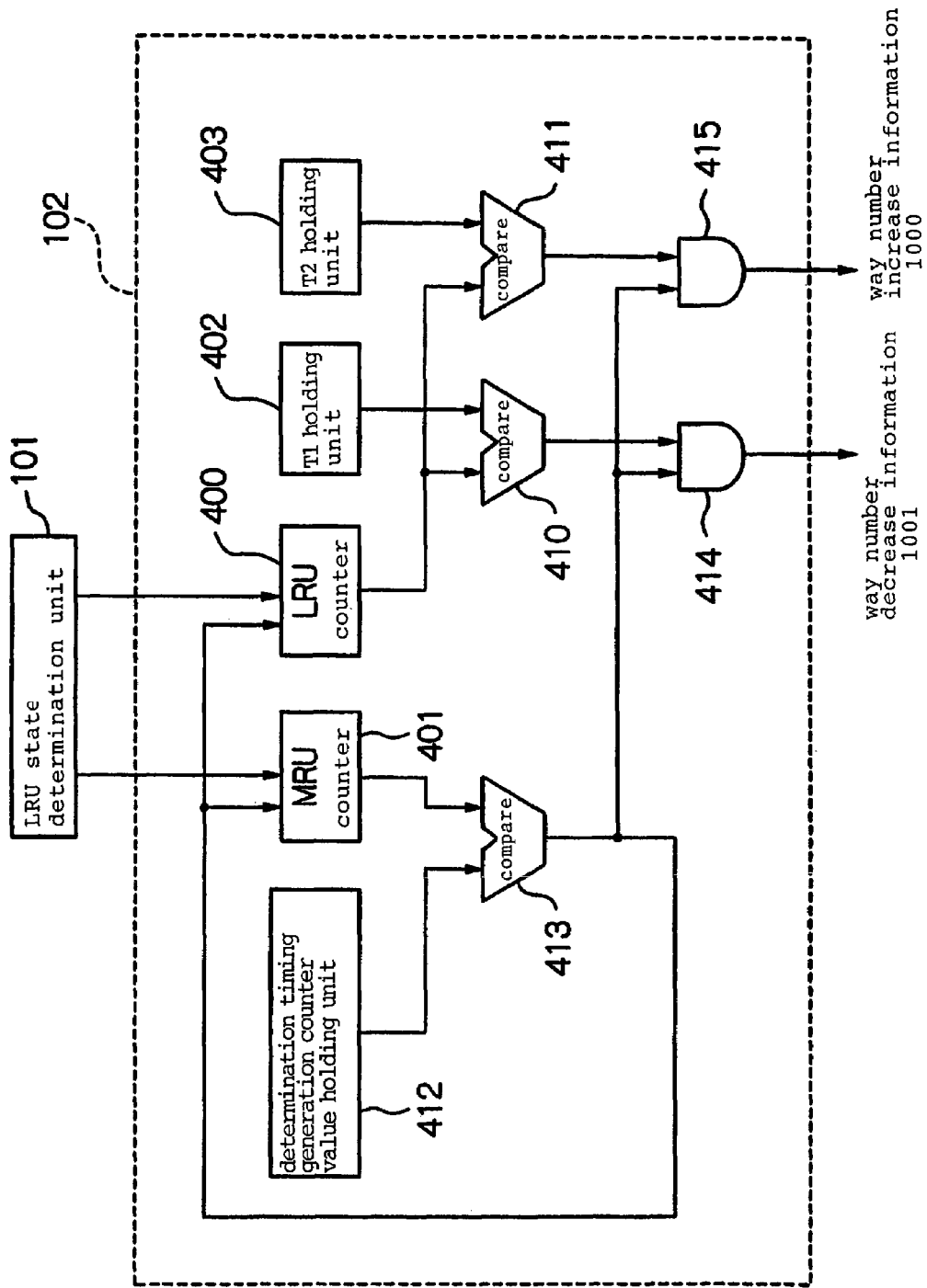
FIG. 6 is a block diagram showing the way number increase/decrease determiner of the first embodiment.

FIG. 6 is a block diagram showing the way number increase/decrease determiner in the first embodiment. Referring to FIG. 6, way number increase/decrease determiner 102 includes: LRU counter 400; MRU counter 401; threshold value T1 holding unit 402; threshold value T2 holding unit 403; comparators 410, 411, and 413; determination timing generation counter value holding unit 412, and AND units 414 and 415; and is capable of the above-described determination through the operation of each of these components.

LRU counter 400 counts the number of times that the accessed entry is the LRU entry. For this purpose, LRU counter 400 counts up the number of times the accessed entry is the LRU entry based on the determination results obtained by LRU state determination unit 101.

MRU counter 401 counts the number of times that the accessed entry is the MRU entry. For this purpose, MRU counter 401 counts up the number of times that the accessed entry is the MRU entry based on the determination results obtained by LRU state determination unit 101.

Appraisal function D shown by Formula (1) can use the values of LRU counter 400 and MRU counter 401 to show Formula (2):

$$D = (\text{value of LRU counter})/(\text{value of MRU counter}) \quad (2)$$

This Formula (2) includes division and therefore entails high calculation costs when used as is. However, way number increase/decrease determiner 102 supplies a determination result when the value of MRU counter 401 attains a prescribed value (the set value of determination timing generation counter holding unit 412), whereby the value of MRU counter 401, which is the denominator of Formula (2), can be always kept uniform and the division process can be omitted.

In other words, the value of MRU counter 401 is multiplied on both sides of Formula (2), and the value of LRU counter 400 when the value of MRU counter 401 reaches a prescribed value is used in place of appraisal function D.

Threshold values T1 and T2 that are used here are not directly compared with appraisal function D that is shown in Formula (2) but are compared with the value of LRU counter 400. The values of threshold values T1 and T2 must therefore be converted to a value that takes into consideration the value that has been set in determination timing generation counter holding unit 412.

This use of the value of LRU counter 400 when the value of MRU counter 401 attains a prescribed value, and the use of a value that is obtained by multiplying the prescribed value by original T1 and T2 for the threshold values T1 and T2 enables the comparison of the threshold values with a value that is obtained by dividing the value of LRU counter 400 by the value of MRU counter 401 without carrying out division, which has a high calculation cost, and enables a configuration having a low calculation cost.

Threshold value T1 holding unit 402 stores threshold value T1 that is compared with the value of LRU counter 400 for determining the increase or decrease of the number of operated ways. Threshold value T2 holding unit 403 stores threshold value T2 that is compared with the value of LRU counter 400 for determining the increase or decrease of the number of operated ways. In this case, threshold values T1 and T2 are in the relation: T1<T2, and can be altered as appropriate in accordance with the characteristics of the program that is being executed. In addition, threshold values T1 and T2 may also be varied as appropriate according to the number of operated ways. Threshold values T1 and T2 must be set to appropriate values, but the appropriate values may conceivably change according to the nature of the program or the number of operated ways. In such cases as well, enabling variation of threshold values T1 and T2 according to the program or the number of operated ways in turn enables the calculation of appraisal function D at a constantly fixed accuracy for a variety of programs or various numbers of operated ways and enables control of the selection of the optimum number of operated ways.

Determination timing generation counter value holding unit 412 holds, as a parameter, a value for determining the timing for determining the increase and decrease of the number of operated ways, or in other words, a value for determining the interval for calculating appraisal function D that is shown in Formula (1). Increasing the value that is set in determination timing generation counter value holding unit 412 lengthens the calculation interval of appraisal function D, and blocks the influence of temporary fluctuations of a program. In contrast, decreasing the set value shortens the calculation interval of appraisal function D and therefore causes variation of the number of operated ways that responds with high sensitivity to fluctuations in the access pattern of the program.

If the value of LRU counter 400 is less than threshold value T1, comparator 410 sends a signal indicating this relation to AND unit 414. This corresponds to an access pattern in which access to the MRU entry is concentrated.

If the value of LRU counter 400 is greater than threshold value T2, comparator 411 sends a signal indicating this relation to AND unit 415. This corresponds to an access pattern in which access is comparatively uniform from the MRU entry to the LRU entry.

When the value of MRU counter 401 matches the value that has been set in determination timing generation counter value holding unit 412, comparator 413 sends a match signal that indicates this relation to AND units 414 and 415 and to LRU counter 400 and MRU counter 401.

AND unit 414 sends the signal from comparator 410 at the timing of the match signal from comparator 413 to way number control unit 4 as way number decrease information 1001. AND unit 415 sends the signal from comparator 411 at the timing of the match signal from comparator 413 as way number increase information 1000 to way number control unit 4. In addition, LRU counter 400 and MRU counter 401 reset counter values in response to a match signal from comparator 413.

By the operation of each of the components shown in FIG. 6, way number increase/decrease determiner 102 uses the values of LRU counter 400 and MRU counter 401, threshold value T1, and threshold value T2 to select the increase or decrease of the number of operated ways in accordance with the access pattern of the program that is being executed.

In the present embodiment, LRU counter 400 for the least significant LRU entry and MRU counter 401 for the most significant MRU entry are used to analyze the access pattern of a program based on the relation of the hit number of the MRU entry to the hit number of the LRU entry (Formula (2)), whereby access patterns can be determined easily and at low cost by a configuration that is provided with the minimum counters and that is both simple and compact. However, the present invention is not limited to this form. For example, counters may be provided for ways other than the LRU entry and the MRU entry and the access pattern of a program may be analyzed in greater detail and with higher accuracy to most appropriately determine whether number of operated ways should be increased or decreased.

It is further assumed that way number increase information 1000 and way number decrease information 1001 from way number increase/decrease determiner 102 are collectively referred to as "way number increase/decrease information."

In FIG. 2, way number control unit 4 controls the number of operated ways in accordance with way number increase/decrease information from way number increase/decrease determination unit 2. In this case, the number of operated ways is assumed to be controlled within the range of 2-4, and as a result, way number control unit 4 is assumed to select operation or non-operation of way 32 and way 33 by way-32 halt information 1005 and way-33 halt information 1006. The power and clocks that are required for operation are then supplied to ways that are to be operated and not supplied to ways that are not to be operated. Ways 30 and 31 are always operated and power and clocks are therefore always supplied to these ways.

In addition, way number control unit 4 sends way configuration information 1004 that indicates the number of operated ways and which ways are being operated to cache control unit 10, way number increase/decrease determination unit 2, and hit determination unit 24.

Explanation next regards the operation of the cache configuration 1 of the present embodiment during reading. However, the operation during writing is also similar to the operation during reading.

A read command and address are first supplied from a processor (not shown) to cache configuration 1.

Cache control unit 10, upon receiving the read command, instructs each of ways 30-33 to supply as output the addresses and data that are stored in the tag memories and data memories of each of ways 30-33. In addition, address decoder 11 extracts set address 201 and tag address 202 from the supplied addresses. Address decoder 11 then sends set address 201 to each of ways 30-33 and way number increase/decrease determination unit 2, and sends tag address 202 to address comparators 20-23.

Tag memory 40 in way 30, based on the instructions from cache control unit 10 and set address 201 from address decoder 11, specifies the set in which data of the address for which access occurred may be stored and sends the address that is stored in this set to address comparator 20.

Data memory 50 in way 30, based on the instructions from cache control unit 10 and set address 201, specifies the set in which data of the address for which access occurred may be stored and sends data that are stored in this set to data multiplexer 12.

Similarly, tag memory 41 in way 31, based on the instructions from cache control unit 10 and set address 201, specifies the set in which data of the address for which access occurred may be stored and sends the address that is stored in this set to address comparator 21.

Data memory 51, based on the instructions from cache control unit 10 and set address 201, specifies the set in which data of the address for which access occurred may be stored, and sends data that are stored in this set to data multiplexer 12.

Similarly, tag memory 42 in way 32, based on the instructions from cache control unit 10 and set address 201, specifies the set in which data of the address for which access occurred may be stored, and sends the address that is stored in this set to address comparator 22.

Data memory 52, based on the instructions of cache control unit 10 and set address 201, specifies the set in which data of the address for which access occurred may be stored, and sends the data that are stored in this set to data multiplexer 12.

Similarly, tag memory 43 in way 33, based on the instructions from cache control unit 10 and set address 201, specifies the set in which data of the address for which access occurred may be stored, and sends the address that is stored in this set to address comparator 23.

Data memory 53, based on the instructions from cache control unit 10 and set address 201, specifies the set in which data of the address for which access occurred may be stored, and sends data that are stored in this set to data multiplexer 12.

Address comparator 20 compares the tag address from tag memory 40 with tag address 202 from address decoder 11 and sends the comparison result to hit determination unit 24. Similarly, address comparator 21 compares the tag address from tag memory 41 with tag address 202 from address decoder 11 and sends the comparison result to hit determination unit 24. Address comparator 22 compares the tag address from tag memory 42 with tag address 202 from address decoder 11 and sends the comparison result to hit determination unit 24. Address comparator 23 compares the tag address from tag memory 43 with tag address 202 from address decoder 11 and sends the comparison result to hit determination unit 24.

Hit determination unit 24 determines a cache hit or cache miss based on the comparison results from address comparator 20, address comparator 21, address comparator 22, and address comparator 23. A match that occurs in any of address comparators 20-23 is a cache hit, and failure to match in all of address comparators 20-23 is a cache miss.

When a cache hit occurs, hit determination unit 24 sends hit information 1100 that indicates that a cache hit has occurred and hit way position information 1101 that indicates the way in which the hit occurred. Hit information 1100 is sent to way number increase/decrease determination unit 2, cache control unit 10, and data multiplexer 12. Hit way position information 1101 is sent to way number increase/decrease determination unit 2 and data multiplexer 12. In accordance with hit way position information 1101, data multiplexer 12 selects data from the data memory of the way in which the hit occurred and sends the data to the processor.

When a cache miss occurs, hit determination unit 24 reports this miss to cache control unit 10. In this case, the cache content is updated to the data from the main memory (not shown) under the control of cache control unit 10.

Way number increase/decrease determination unit 2 receives hit information 1100 and hit way position information 1101 from hit determination unit 24 and receives set address 201 of data for which the hit occurred from address decoder 11.

In FIG. 4, LRU state determination unit 101, upon receiving hit information 1100, finds the LRU state value of the way in which the data for which the cache hit occurred are stored based on hit way position information 1101 and the LRU state value information, and then updates and stores the LRU state value of each way in LRU state value holding unit 100.

At this time, the method of updating the LRU state value information is as shown in following steps 1-3:

1: The LRU state value of the way in which the hit occurred is updated to "0."

2: "1" is added to the LRU state value of ways holding a LRU state value that is smaller than the LRU state value before update of the way in which the hit occurred.

3: The LRU state value of ways holding a LRU state value that is greater than the LRU state value before update of the way in which the hit occurred is not changed.

In FIG. 6, LRU state determination unit 101 sends a count-up signal to LRU counter 400 when a cache hit has occurred in an LRU entry. Similarly, LRU state determination unit 101 sends a count-up signal to MRU counter 401 when a cache hit has occurred in an MRU entry.

Figure 7:
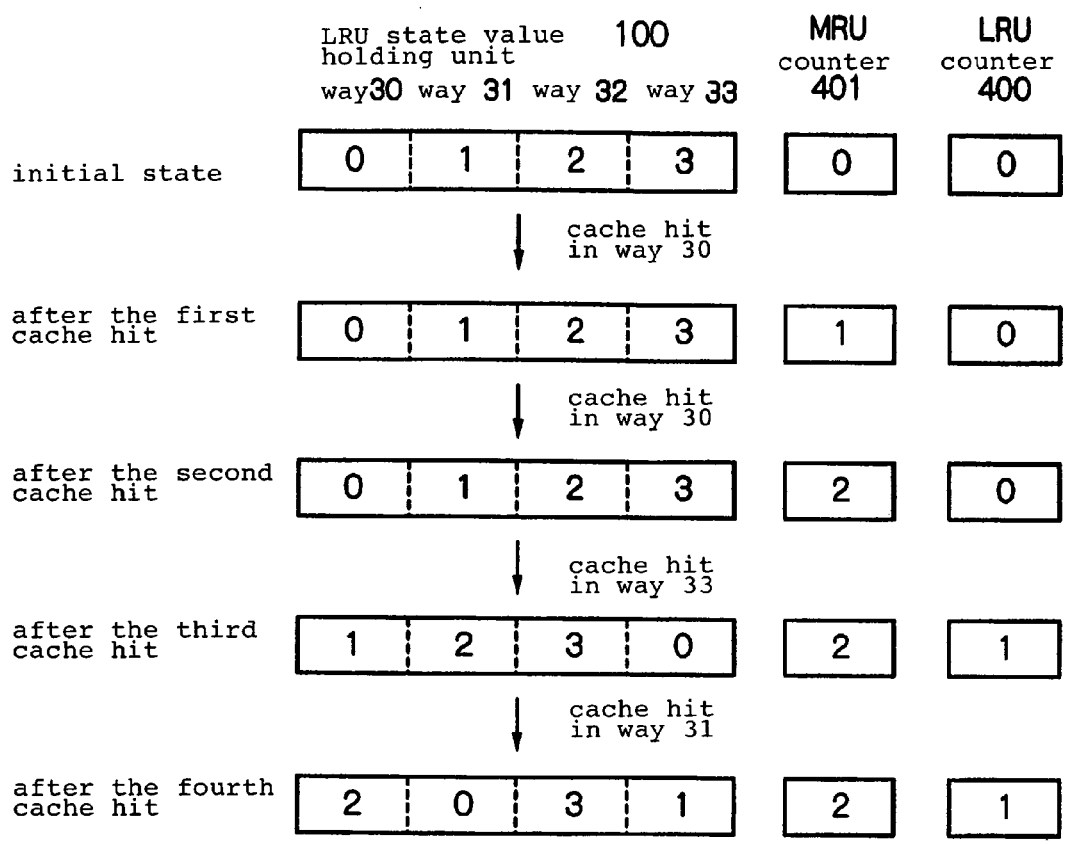
FIG. 7 shows the state of operation of the update of the LRU state value information, the MRU counter, and the LRU counter.

FIG. 7 shows the update of LRU state value information and the state of operation of LRU counter 400 and MRU counter 401. The LRU state value information in FIG. 7 shows the LRU state value information of set 0 as one example.

In the initial state, the LRU state value of way 30 is "0," the LRU state value of way 31 is "1," the LRU state value of way 32 is "2," and the LRU state value of way 33 is "3." In addition, "0" is stored as the initial value in LRU counter 400 and MRU counter 401.

It is next assumed that as the first instance of a cache hit, a cache hit occurs for data that are stored in the entry of way 30 on set 0. In this case, the cache hit is for the way having the smallest LRU state value of "0," and the LRU state value information is therefore unaltered and the MRU counter 401 is counted up from "0" to "1."

It is next assumed that, as the second instance of a cache hit, a cache hit occurs for data that are stored in the entry of way 30 on set 0. In this case, the cache hit is again for the way having the smallest LRU state value of "0," and the LRU state value information is therefore unaltered and MRU counter 401 is counted up from "1" to "2."

It is next assumed that, as the third instance of a cache hit, a cache hit occurs for data that are stored in the entry of way 33 on set 0. The LRU state value of way 33 is "3," and this time the LRU state value information is therefore updated. The LRU state value of way 33 becomes "0," the LRU state value of way 30 becomes "1," the LRU state value of way 31 becomes "2," and the LRU state value of way 32 becomes "3." The updated LRU state value information is written back to LRU state value holding unit 100. In addition, the LRU state value of way 33 before updating was the largest value at "3," and LRU counter 400 is therefore counted up from "0" to "1" as a cache hit in the LRU entry.

It is next assumed that as the fourth cache hit, a cache hit occurs for data that are stored in the entry of way 31 on set 0. The LRU state value of way 31 is "2," and the LRU state value information is therefore updated. The LRU state value of way 31 becomes "0," the LRU state value of way 33 becomes "1," the LRU state value of way 30 becomes "2," and the LRU state value of way 32 remains unchanged at "3." The updated LRU state value information is written back to LRU state value holding unit 100. In addition, the LRU state value of the entry of way 31 before updating was "2," and as a result, neither of LRU counter 400 nor MRU counter 401 are counted up.

Subsequently, it is determined whether data for which cache hits occur exist in the MRU entry or in the LRU entry, and LRU counter 400 and MRU counter 401 are successively counted up.

In FIG. 6, when the value of MRU counter 401 attains the value (prescribed value) that is stored in determination timing generation counter value holding unit 412, way number increase/decrease determiner 102 uses the value of LRU counter 400 to appraise the access pattern of the program that is being executed and determines the increase or decrease of the number of operated ways in accordance with the results of the appraisal.

At this time, comparator 410 compares the value of LRU counter 400 with threshold value T1, and generates way number decrease information 1001 if the value of LRU counter 400 is smaller than threshold value T1. Comparator 411 compares the value of LRU counter 400 with threshold value T2 and generates way number increase information 1000 if the value of LRU counter 400 is greater than threshold value T2.

The output of the comparison result of comparator 413 is connected to AND units 414 and 415 in order to guard the output of comparator 410 and comparator 411. As a result, way number increase information 1000 or way number decrease information 1001 is sent from way number increase/decrease determiner 102 only when the value of MRU counter 401 attains the value (prescribed value) that is stored in determination timing generation counter value holding unit 412. In other words, way number increase/decrease determiner 102 sends way number increase/decrease information to way number control unit 4 at the timing at which MRU counter 401 reaches the prescribed value.

In addition, the comparison result from comparator 413 is provided to LRU counter 400 and MRU counter 401 such that LRU counter 400 and MRU counter 401 are reset when a match occurs in the comparison of comparator 413. Accordingly, LRU counter 400 and MRU counter 401 are reset when the value of MRU counter 401 attains the value (prescribed value) that is stored in determination timing generation counter value holding unit 412.

In FIG. 2, way number control unit 4 increases or decreases the number of operated ways in accordance with the way number increase/decrease information from way number increase/decrease determination unit 2. Power consumption is reduced if the number of operated ways is decreased, and cache performance is improved if the number of operated ways is increased. When the number of operated ways changes, the LRU state value information that is stored in LRU state value holding unit 100 is initialized together with the new number of operated ways.

As the method of determining the ways in which operation is to be terminated, operation may be terminated beginning from, for example, ways having a large way number, as shown in FIG. 5. In this case, the initial value immediately succeeding the change of the number of operated ways may be appended from the way having the smallest way number.

Figure 8:
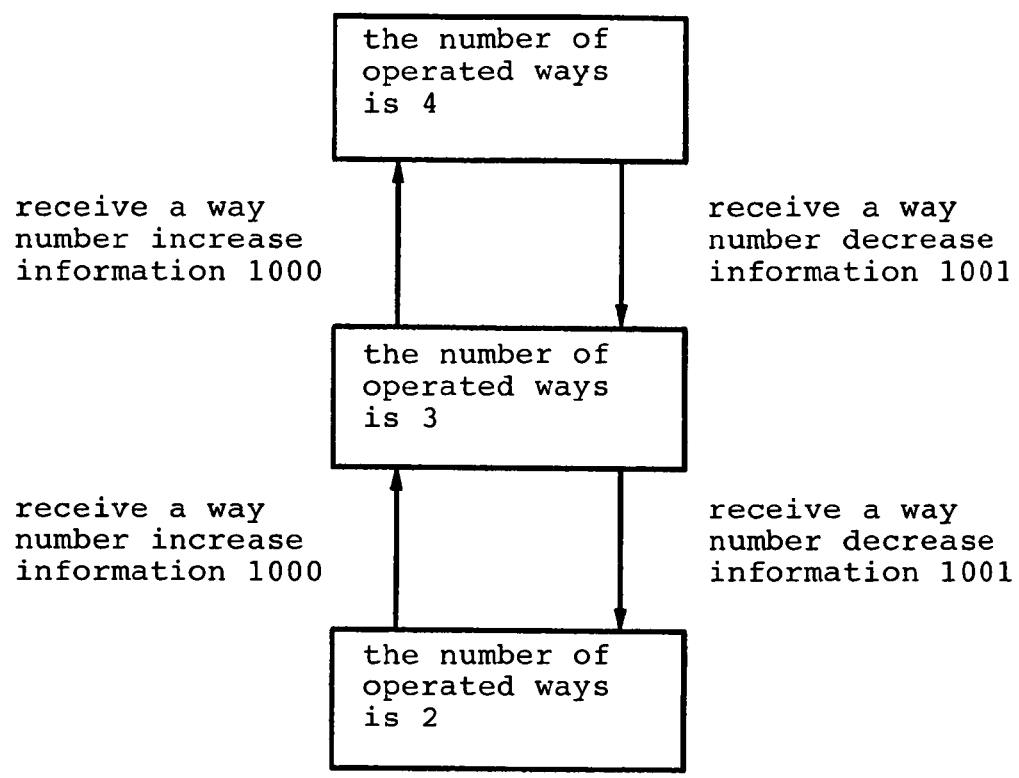
FIG. 8 is a view for explaining the operation of the way number control unit in the first embodiment.

FIG. 8 is a view for explaining the operation of way number control unit 4 in the first embodiment. Way number control unit 4 changes the number of operated ways in accordance with way number increase information 1000 or way number decrease information 1001 that is supplied from way number increase/decrease determination unit 2.

Next, as shown in the upper section of FIG. 8, when the number of operated ways is 4, way number control unit 4 does not send way 32 halt information 1005 to way 32, and further, does not send way 33 halt information 1006 to way 33.

As shown in the middle section of FIG. 8, when the number of operated ways is 3, way number control unit 4 sends way-33 halt information 1006 to way 33 and halts the supply of power and clocks to way 33.

As shown in the lower section of FIG. 8, when the number of operated ways is 2, way number control unit 4 sends way-32 halt information 1005 to way 32 and way-33 halt information 1006 to way 33, and halts the supply of power and clocks to ways 32 and 33.

Further, way number control unit 4 sends way configuration information 1004 to way number increase/decrease determination unit 2, cache control unit 10, and hit determination unit 24. Cache control unit 10 determines based on way configuration information 1004 whether each way is operating or halted and does not send commands to ways that are halted. Hit determination unit 24 determines whether each way is in operation or halted and makes the comparison results from halted ways invalid.

When the number of ways is to be decreased, the ways that are to be halted flush the data that are being stored within. In the case of a write-back type cache memory, the content of the cache is written back to the main storage memory.

As explained in the foregoing description, according to cache configuration 1 of the present embodiment, way number increase/decrease determination unit 2 uses the determination results of cache hits in hit determination unit 24 to analyze the access pattern of the program that is being executed and determines the number of operated ways that is appropriate to this access pattern, and way number control unit 4 controls the number of operated ways in accordance with this determination. As a result, the necessary number of operated ways can be found accurately, the operation of unnecessary ways can be halted, and operation can be carried out by the appropriate number of operated ways in accordance with the characteristics of the program and its operation. In this way, the maximum reduction of power consumption can be achieved while suppressing any drops in cache performance.

Here, in order to stabilize the number of operated ways, the relation T1<T2 is provided between threshold value T1 and threshold value T2 to provide a determination to sustain the number of operated ways between the determination to increase and the determination to decrease the number of operated ways. However, T1 may also equal T2 if it is appropriate in the determination of the number of operated ways to augment the follow-up performance of the number of operated ways with respect to changes in the access pattern by causing threshold values T1 and T2 for determining increase and decrease to coincide and thus compel a determination to either increase or decrease. In such a case, comparator 410 and comparator 411 in FIG. 6 may be a single comparator, and this comparator may send way number decrease information 1001 if the value of LRU counter 400 is lower than the threshold value and send way number increase information 1000 if the value of LRU counter 400 is greater than the threshold value.

Explanation next regards the second embodiment.

In the first embodiment, way number increase/decrease determiner 102 determined the increase or decrease of the number of ways when the value of MRU counter 401 attained a prescribed value, but the present invention is not limited to this form. In the second embodiment, the determination to increase or decrease the number of ways is carried out when the number of cache hits attains a prescribed value.

In this case, the value of MRU counter 401 at the time of determination is not fixed and the value of LRU counter 400 therefore cannot be used in place of appraisal function D. However, the original appraisal function D can be modified as shown below.

As described in the foregoing explanation, way number increase/decrease determiner 102 must compare the relation in size between appraisal function D and threshold value T1. For this purpose, a determination must be implemented to find whether Formula (3) is satisfied:

$$(\text{LRU counter value})/(\text{MRU counter value}) < T1 \quad (3)$$

However, Formula (3) in this form includes division, which entails a high calculation cost, and rather than using this formula as is, Formula (4), in which both sides of the equation have been multiplied by the value of the MRU counter, should be used in the determination.

$$(\text{LRU counter value}) < (\text{threshold value T1}) \times (\text{MRU counter value}) \quad (4)$$

In this way, the size relation between appraisal function D and threshold value T1 can be found though multiplication and size comparison and without carrying out division. In addition, the size relation between appraisal function D and threshold value T2 can also be found similarly by means of Formula (5).

$$(\text{LRU counter value}) > (\text{threshold value T2}) \times (\text{MRU counter value}) \quad (5)$$

In order to use Formula (4) and Formula (5) to determine increase or decrease of the number of ways, the way number increase/decrease determiner of the second embodiment has a different configuration than the way number increase/decrease determiner in the first embodiment.

Figure 9:
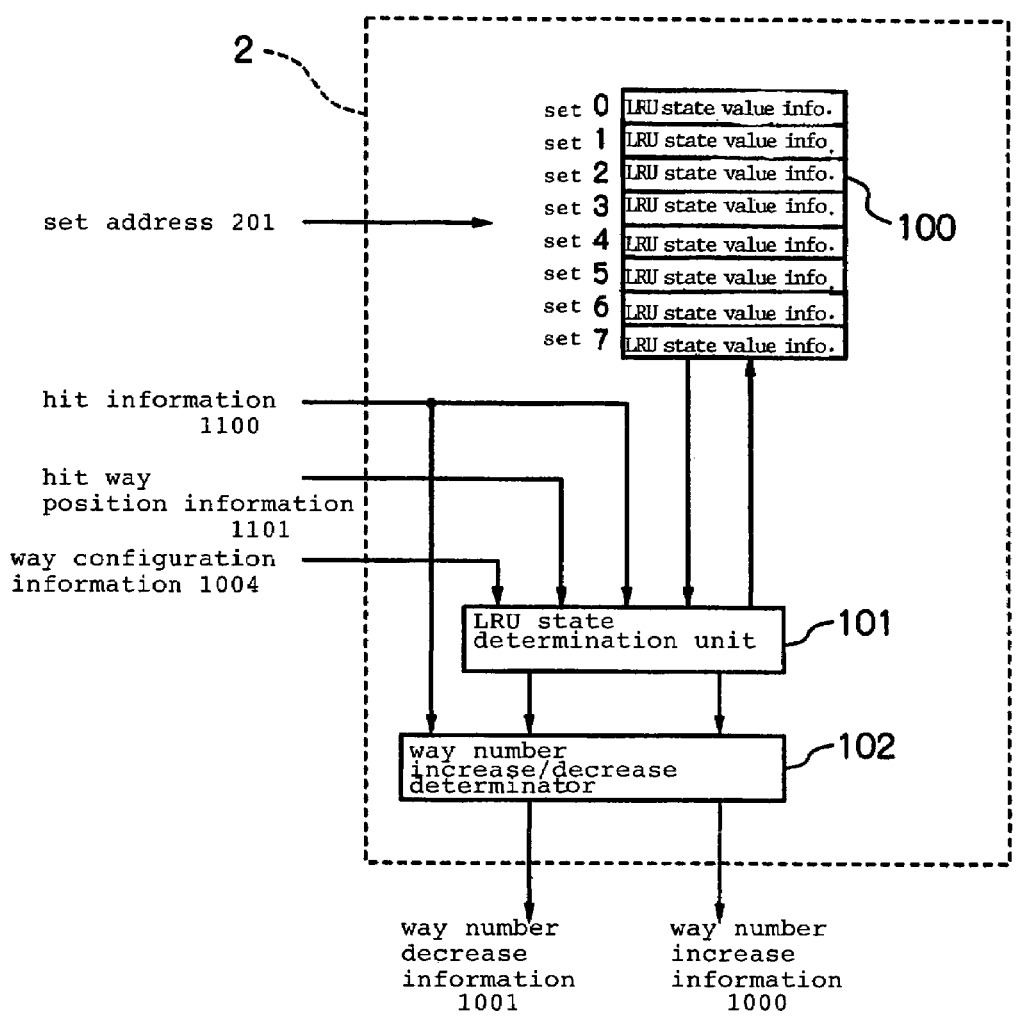
FIG. 9 is a block diagram showing the way number increase/decrease determination unit of the second embodiment.

FIG. 9 is a block diagram showing the way number increase/decrease determination unit of the second embodiment. Referring to FIG. 9, way number increase/decrease determination unit 2 of the second embodiment includes LRU state value holding unit 100, LRU state determination unit 101, and way number increase/decrease determiner 102, as in the first embodiment. In FIG. 9, LRU state value holding unit 100 and LRU state determination unit 101 are equivalent to the components of FIG. 4, but way number increase/decrease determiner 102 differs in that hit information 1100 is supplied to way number increase/decrease determiner 102.

Figure 10:
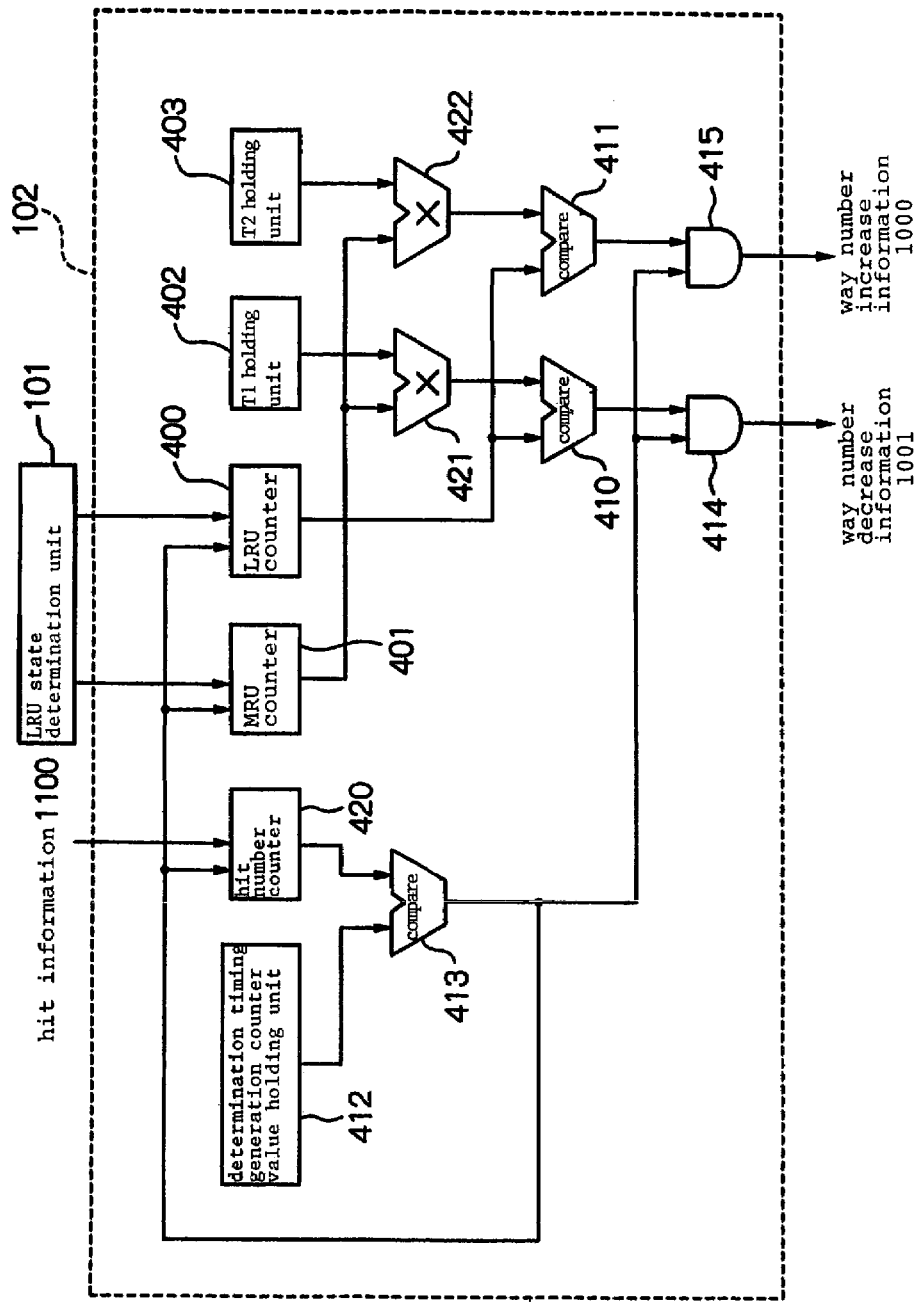
FIG. 10 is a block diagram showing the way number increase/decrease determiner of the second embodiment.

FIG. 10 is a block diagram showing the way number increase/decrease determiner of the second embodiment. Referring to FIG. 10, way number increase/decrease determiner 102 includes: LRU counter 400; MRU counter 401; threshold value T1 holding unit 402; threshold value T2 holding unit 403; comparators 410, 411, and 413; determination timing generation counter value holding unit 412, hit number counter 420, threshold value T1 multiplier 421, threshold value T2 multiplier 422, and AND units 414 and 415. The above-described determination can be realized by the operation of these components.

LRU counter 400 counts the number of times that the accessed entry was the LRU entry. MRU counter 401 counts the number of times the accessed entry was the MRU entry.

Threshold value T1 holding unit 402 stores threshold value T1 for determining increase or decrease of the number of operated ways. Threshold value T2 holding unit 403 stores threshold value T2 for determining increase or decrease of the number of operated ways. Threshold values T1 and T2 are in the relation T1<T2, and these values are modified according to the program that is being executed or according to the number of operated ways.

Threshold value T1 multiplier 421 is a multiplier for finding (threshold value T1×MRU counter value) that is used in the determination of Formula (4). Threshold value T2 multiplier 422 is a multiplier for finding (threshold value T2×MRU counter value) that is used in the determination of Formula (5).

Comparator 410 is connected to LRU counter 400 and threshold value T1 multiplier 421.

If the value of LRU counter 400 is smaller than (threshold value T1×MRU counter value), comparator 410 sends a signal indicating this relation to AND unit 414. This corresponds to an access pattern in which access is concentrated on the MRU entry.

Comparator 411 is connected to LRU counter 400 and threshold value T2 multiplier 422.

If the value of LRU counter 400 is greater than (threshold value T2×MRU counter value), comparator 411 sends a signal indicating this relation to AND unit 415. This corresponds to an access pattern in which access is comparatively uniform from the MRU entry to the LRU entry.

Hit number counter 420 counts the number of cache hits based on hit information 1100 and supplies this value to comparator 413. Determination timing generation counter value holding unit 412 holds a value as a parameter for determining the timing for the determination of increase or decrease of the number of operated ways.

When the value of hit number counter 420 matches the value that is set in determination timing generation counter value holding unit 412, comparator 413 sends a match signal indicating this relation to AND units 414 and 415, LRU counter 400, MRU counter 401, and hit number counter 420.

AND unit 414 sends the signal from comparator 410 to way number control unit 4 as way number decrease information 1001 at the timing of the match signal from comparator 413. AND unit 415 sends the signal from comparator 411 to way number control unit 4 as way number increase information 1000 at the timing of the match signal from comparator 413. In addition, the counter values of LRU counter 400, MRU counter 401, and hit number counter 420 are reset by a match signal from comparator 413.

As described in the foregoing explanation, according to cache configuration 1 of the present embodiment, way number increase/decrease determination unit 2 uses the results of determining cache hits by hit determination unit 24 to find the access pattern when the number of hits reaches a prescribed value in the program that is being executed and determines the number of operated ways that is appropriate to that access pattern, and way number control unit 4 controls the number of operated ways according to this determination. Thus, by using appraisal function D when the number of cache hits reaches a prescribed value, a time interval can be secured in which the access pattern is reflected in appraisal function D with a fixed accuracy, the number of operated ways can be selected that is appropriate to the characteristics of the program, and the maximum reduction of power consumption can be achieved while suppressing drops in cache performance.

Values that are obtained by multiplying the value of the MRU counter at the determination timing by threshold values T1 and T2 are used for comparison with the value of LRU counter 400 at the determination timing, whereby a low-cost configuration can be realized in which division, which entails a high calculation cost, is not carried out even when the value of MRU counter 401 at the determination timing is not fixed, as was the case in the first embodiment.

Explanation next regards the third embodiment.

In the third embodiment, the determination of increase or decrease of the number of operated ways is carried out when the number of cache accesses reaches a prescribed value. In this case, as in the second embodiment, the value of MRU counter 401 is not fixed at the time of determination, and Formulas (4) and (5) are therefore used for determining increase or decrease of the number of operated ways.

Figure 11:
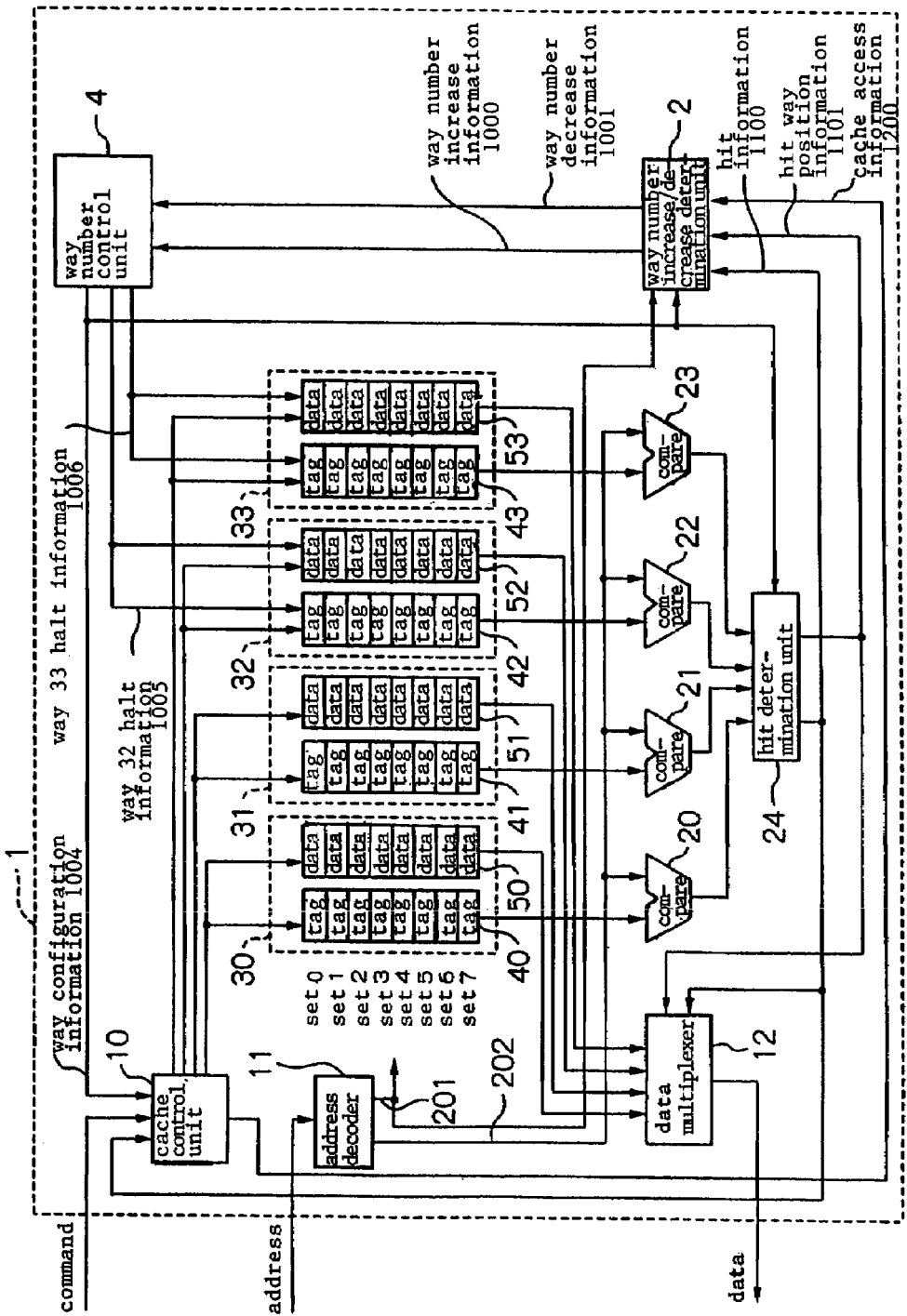
FIG. 11 is a block diagram showing the cache configuration of the third embodiment.

FIG. 11 is a block diagram showing the cache configuration of the third embodiment. Referring to FIG. 11, the point of difference between cache configuration 1 of the third embodiment and the configuration shown in FIG. 2 is the addition of cache access information 1200 that is sent from cache control unit 10 to way number increase/decrease determination unit 2. Cache access information 1200 is information indicating that access to the cache has occurred, and this information may include both cache hits and cache misses.

Cache control unit 10, upon being supplied with a command from the outside, determines that access to the cache has occurred and sends cache access information 1200 to way number increase/decrease determination unit 2.

Figure 12:
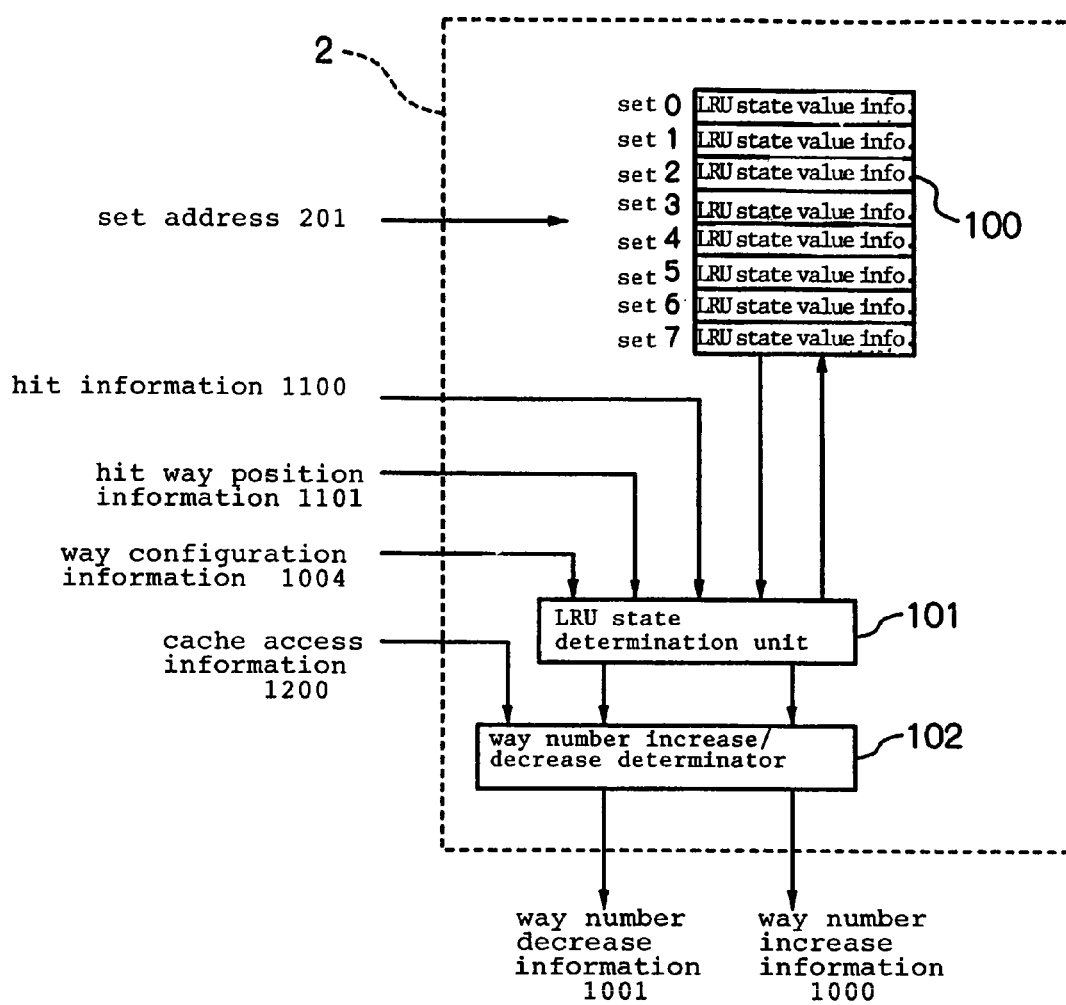
FIG. 12 is a block diagram showing the way number increase/decrease determination unit of the third embodiment.

FIG. 12 is a block diagram showing the way number increase/decrease determination unit of the third embodiment. Referring to FIG. 12, way number increase/decrease determination unit 2 of the third embodiment, as with the first embodiment, includes: LRU state value holding unit 100, LRU state determination unit 101, and way number increase/decrease determiner 102. In FIG. 12, LRU state value holding unit 100 and LRU state determination unit 101 are equivalent to the components shown in FIG. 4, but way number increase/decrease determiner 102 differs in that cache access information 1200 is supplied to way number increase/decrease determiner 102.

Figure 13:
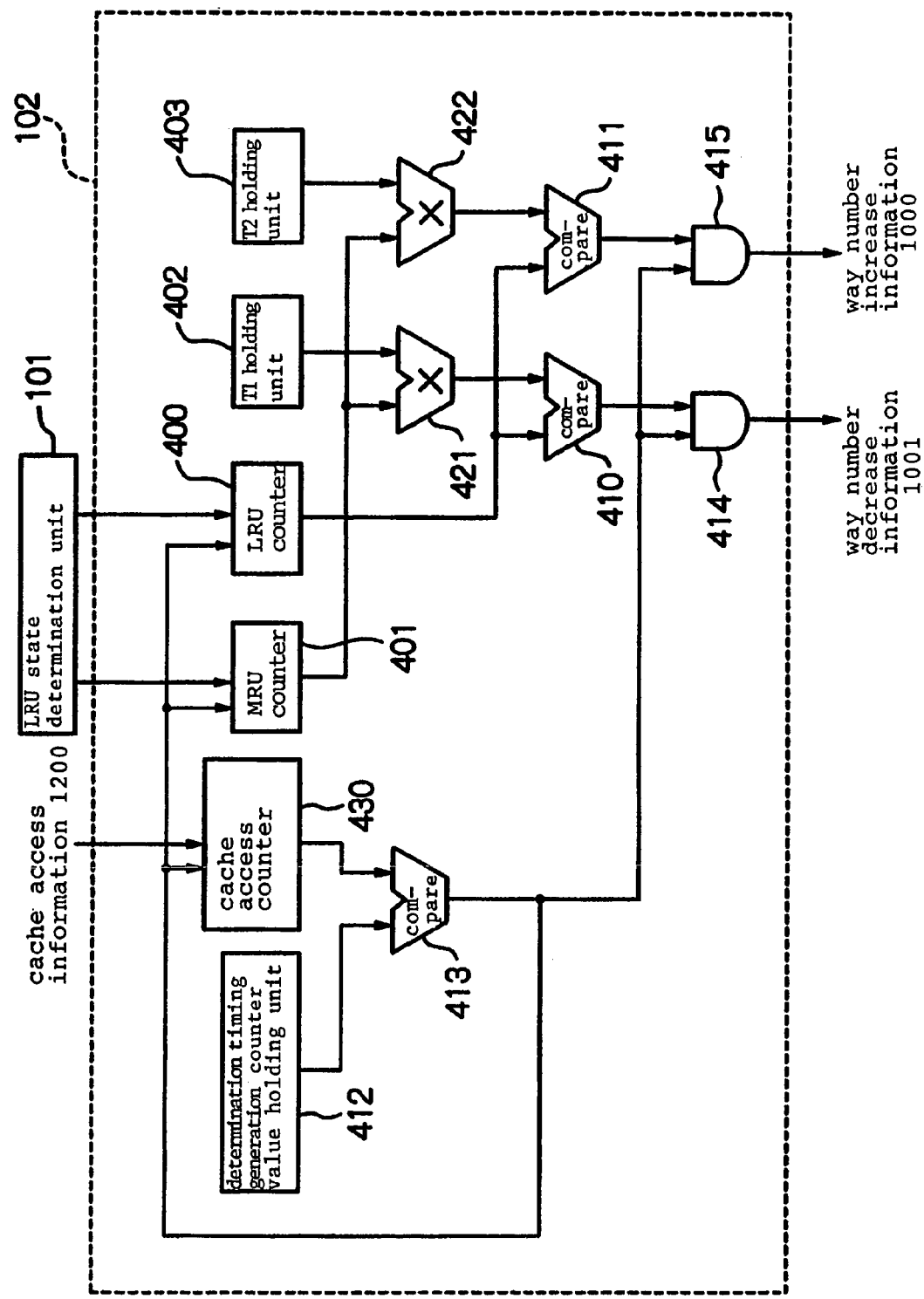
FIG. 13 is a block diagram showing the way number increase/decrease determiner of the third embodiment.

FIG. 13 is a block diagram showing the way number increase/decrease determiner of the third embodiment. Referring to FIG. 13, way number increase/decrease determiner 102 includes: LRU counter 400; MRU counter 401; threshold value T1 holding unit 402; threshold value T2 holding unit 403; comparators 410, 411, and 413; determination timing generation counter value holding unit 412; cache access counter 430; threshold value T1 multiplier 421; threshold value T2 multiplier 422; and AND units 414 and 415. Way number increase/decrease determiner 102 of the third embodiment differs from the second embodiment only in its inclusion of cache access counter 430 in place of hit number counter 420.

Cache access counter 430 counts the number of instances of access to the cache based on cache access information 1200 and supplies this value to comparator 413. The determination to increase or decrease the number of operated ways is thus carried out when the value of cache access counter 430 attains the value (prescribed value) that is stored in determination timing generation counter value holding unit 412.

As described in the foregoing explanation, according to cache configuration 1 of the present embodiment, way number increase/decrease determination unit 2 uses the determination results of cache hits by hit determination unit 24 to find the access pattern when the number of instances of cache access in the program that is being executed reaches a prescribed value and determines the number of operated ways that is appropriate to this access pattern, and way number control unit 4 controls the number of operated ways in accordance with this determination. Thus, by using appraisal function D at the time that the number of instances of cache access reaches a prescribed value, an interval can be ensured in which the access pattern is reflected in the appraisal value at a fixed accuracy, the number of operated ways that is appropriate to the characteristics of the program can be selected, and the maximum reduction of power consumption can be achieved while suppressing drops in the performance of the cache.

Explanation next regards the fourth embodiment.

Although way number control unit 4 used the way number increase/decrease information from way number increase/decrease determination unit 2 without alteration to increase or decrease the number of operated ways in the first to third embodiments, the present invention is not limited to this form. The fourth embodiment is provided with necessary way number prediction unit 3 between way number increase/decrease determination unit 2 and way number control unit 4 for correcting the determination of increase or decrease of the number of operated ways.

Figure 14:
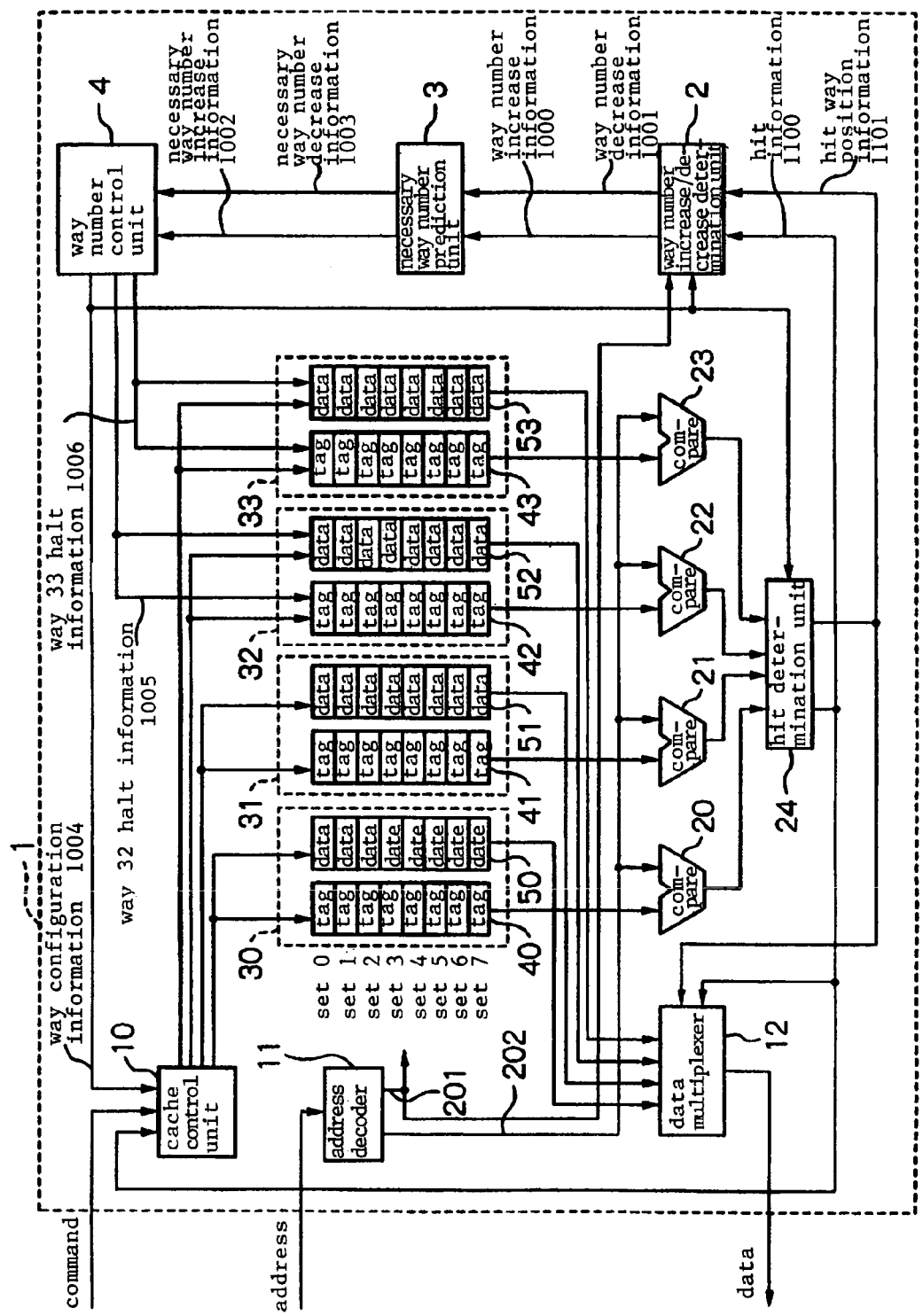
FIG. 14 is a block diagram showing the cache configuration of the fourth embodiment.

FIG. 14 is a block diagram showing the cache configuration of the fourth embodiment. The cache configuration of the fourth embodiment that is shown in FIG. 14 differs from the configuration of FIG. 2 only in the provision of necessary way number prediction unit 3 between way number increase/decrease determination unit 2 and way number control unit 4, and is otherwise the same.

Depending on the program, programs may, through temporary behavior, operate with an access pattern that diverges from the usual access pattern of the program. In some cases, the increase or decrease of cache capacity according to such temporary changes in operation is not necessarily appropriate, and the cache capacity may at times immediately become insufficient or excessive.

As a result, it is sometimes effective to control cache capacity after having established within a particular time interval whether the change in the access pattern is a temporary operational change or a regular change in access pattern. In addition, the time interval that is suitable for making this determination may differ for implementing control toward increasing the cache capacity and control toward decreasing the cache capacity. The intervals for making these determinations may vary according to the characteristics of the program, or may vary according to the design policy of the device that applies the cache configuration.

For example, when the cache performance is given priority over reducing power consumption and the cache performance is to be strongly sustained with respect to temporary behavior of the program, determination for increasing cache capacity is preferably realized by comparatively short time intervals while determination for decreasing cache capacity is preferably realized by comparatively long time intervals. Conversely, when the effect of reducing power consumption is given priority over cache performance, determination for reducing cache capacity is preferably realized by comparatively short time intervals and determination for increasing the cache capacity is preferably realized by comparatively long time intervals.

Necessary way number prediction unit 3 uses a counter in which count-up and count-down are asymmetric to determine the state, makes state transitions in accordance with way number increase/decrease information from way number increase/decrease determination unit 2, and determines the increase or decrease of the number of operated ways in accordance with the transition state.

The states that can be taken by the asymmetric counter of necessary way number prediction unit 3 include one "increase way number" state, one "decrease way number" state, and one or more "sustain way number" states. One or more "sustain way number" states are placed between the "increase way number" and "decrease way number" states. Necessary way number prediction unit 3, upon receiving way number increase/decrease information, causes transitions between each of the states in accordance with prescribed rules. Regarding the state transition rules, transitions toward increase and transitions toward decrease are optimally determined by, for example, the characteristics of the program or the design policy of the device that applies the cache configuration, and are typically asymmetric.

If the state following a state transition is "increase way number," necessary way number prediction unit 3 sends necessary way number increase information 1002 to way number control unit 4. On the other hand, if the state following a state transition is "decrease way number," necessary way number prediction unit 3 sends necessary way number decrease information 1003 to way number control unit 4. If the state following a state transition is "sustain way number," necessary way number prediction unit 3 sends neither necessary way number increase information 1002 nor necessary way number decrease information 1003.

Way number control unit 4 controls the number of operated ways in accordance with necessary way number increase information 1002 and necessary way number decrease information 1003 from necessary way number prediction unit 3.

Necessary way number prediction unit 3 does not use the way number increase/decrease information from way number increase/decrease determination unit 2 without alteration in the control of the number of operated ways, but rather, holds a plurality of states for determining the increase or decrease of the number of operated ways and then uses the way number increase/decrease information from way number increase/decrease determination unit 2 to make state transitions. As a result, necessary way number prediction unit 3 controls the number of operated ways after first establishing whether the instructions of the way number increase/decrease information of way number increase/decrease determination unit 2 are temporary or not. Unnecessary changes of the number of ways that are caused by temporary behavior of a program can therefore be suppressed, and further, a balance can be effectively maintained between cache performance and power consumption.

Figure 15:
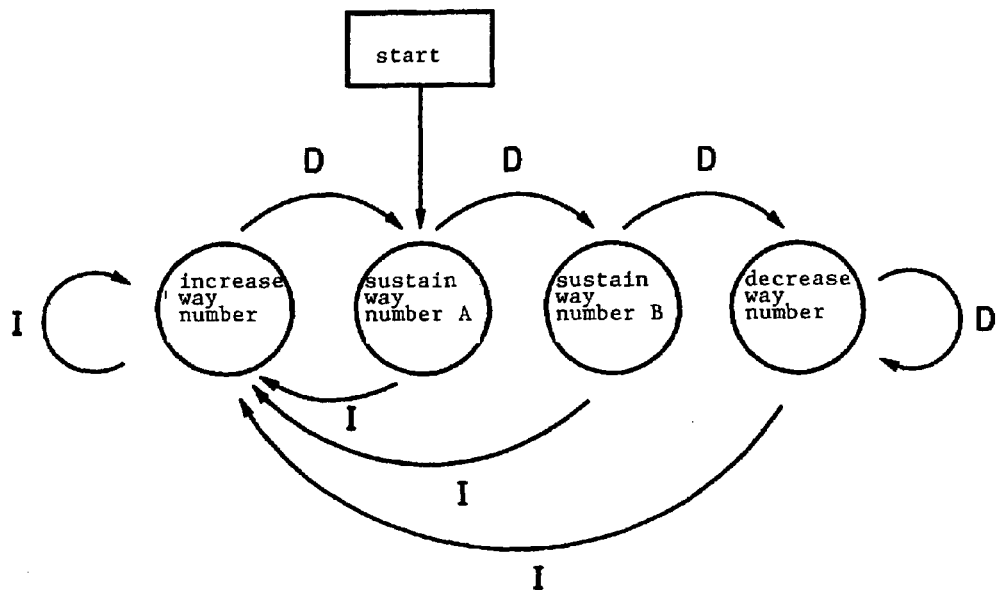
FIG. 15 is a state transition diagram showing the operation of the necessary way number prediction unit of the fourth embodiment.

Here, as one example, necessary way number prediction unit 3 is assumed to use an asymmetric counter composed of two bits. FIG. 15 is a state transition diagram showing the operation of the necessary way number prediction unit of the fourth embodiment. Referring to FIG. 15, necessary way number prediction unit 3 can take four states that are indicated by the two-bit counter, these four states being "increase way number," "sustain way number A," "sustain way number B," and "decrease way number."

The "increase way number" state indicates that more ways should be operated than are in current operation in the program being executed. If the state following the state transition is "increase way number," necessary way number prediction unit 3 sends necessary way number increase information 1002 to way number control unit 4.

The "decrease way number" state indicates that the program that is being executed does not require the current number of ways. If the state following the state transition is "decrease way number," necessary way number prediction unit 3 sends necessary way number decrease information 1003 to way number control unit 4.

The "sustain way number A" and "sustain way number B" states indicate that in the program that is being executed, the number of ways being operated need not be changed, or that an appraisal is currently being implemented to determine whether the number of operated ways should be increased or decreased. If the state following a state transition is "sustain way number A" or "sustain way number B," necessary way number prediction unit 3 sends neither necessary way number increase information 1002 nor necessary way number decrease information 1003.

Necessary way number prediction unit 3, upon receiving way number increase/decrease information from way number increase/decrease determination unit 2, implements state transitions in accordance with FIG. 15. Necessary way number prediction unit 3 implements a transition in accordance with the "I" arrow upon receiving way number increase information 1000, and implements a transition in accordance with the "D" arrow upon receiving way number decrease information 1001. The initial state is "sustain way number A."

According to the state transitions of FIG. 15, to make the transition from the "increase way number" state to the "decrease way number" state, necessary way number prediction unit 3 must receive way number decrease information 1001 three consecutive times. In contrast, necessary way number prediction unit 3 makes the transition from any state to the "increase way number" state upon a single reception of way number increase information 1000.

Figure 16:
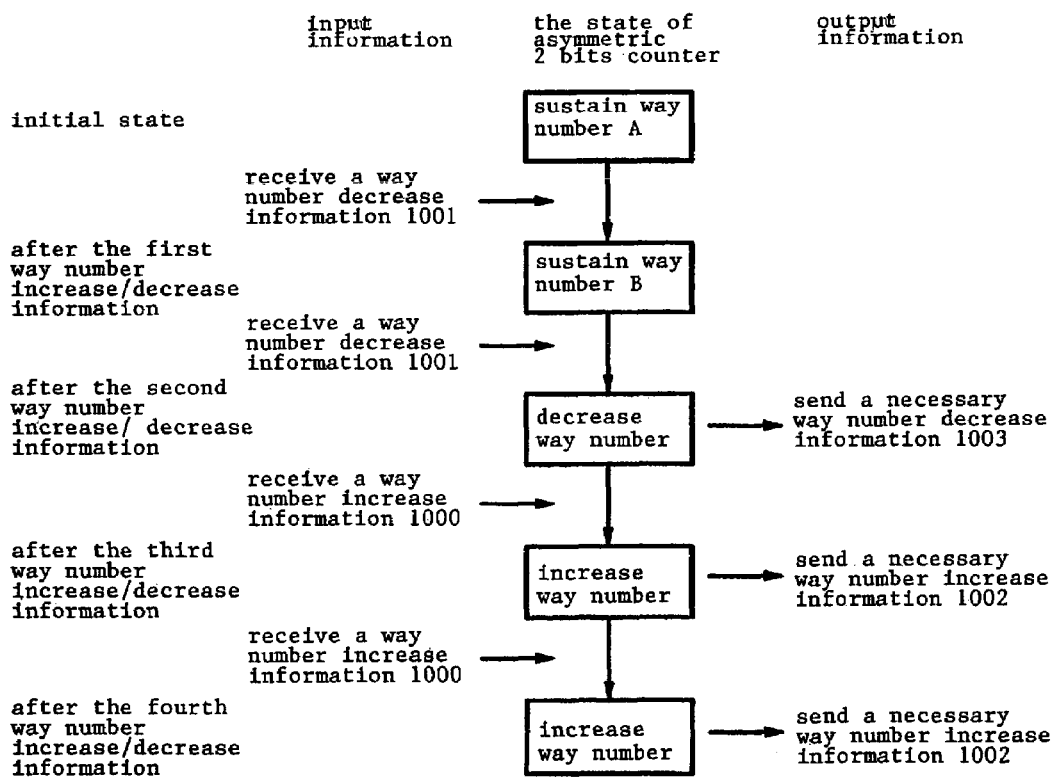
FIG. 16 shows an example of the operation of the necessary way number prediction unit.

FIG. 16 shows an example of the operation of the necessary way number prediction unit.

Referring to FIG. 16, explanation next regards an example of the operation of necessary way number prediction unit 3 in cache configuration 1 of the fourth embodiment. The operation up to the generation of way number increase information 1000 and way number decrease information 1001 by way number increase/decrease determination unit 2 is the same as in the first embodiment.

In the initial state, the counter of necessary way number prediction unit 3 is the "sustain way number A" state.

Necessary way number prediction unit 3 is next assumed to receive way number decrease information 1001 as the first instance of way number increase/decrease information, whereby the state of the asymmetric counter makes the transition from "sustain way number A" to "sustain way number B." In this state, necessary way number prediction unit 3 sends neither necessary way number increase information 1002 nor necessary way number decrease information 1003.

Necessary way number prediction unit 3 is next assumed to receive way number decrease information 1001 as the second way number increase/decrease information, whereby the state of the asymmetric counter makes the transition from "sustain way number B" to "decrease way number." Since the state following state transition is "decrease way number," necessary way number prediction unit 3 sends necessary way number decrease information 1003 to way number control unit 4.

Necessary way number prediction unit 3 is next assumed to receive way number increase information 1000 as the third instance of way number increase/decrease information. The state of the asymmetric counter makes the transition from "decrease way number" to "increase way number." The state following the state transition is "increase way number," and necessary way number prediction unit 3 therefore sends necessary way number increase information 1002 to way number control unit 4.

Necessary way number prediction unit 3 is next assumed to receive way number increase information 1000 as the fourth instance of way number increase/decrease information, whereby the state of the asymmetric counter makes the transition from "increase way number" to "increase way number." Since the state following the state transition is "increase way number," necessary way number prediction unit 3 sends necessary way number increase information 1002 to way number control unit 4.

Figure 17:
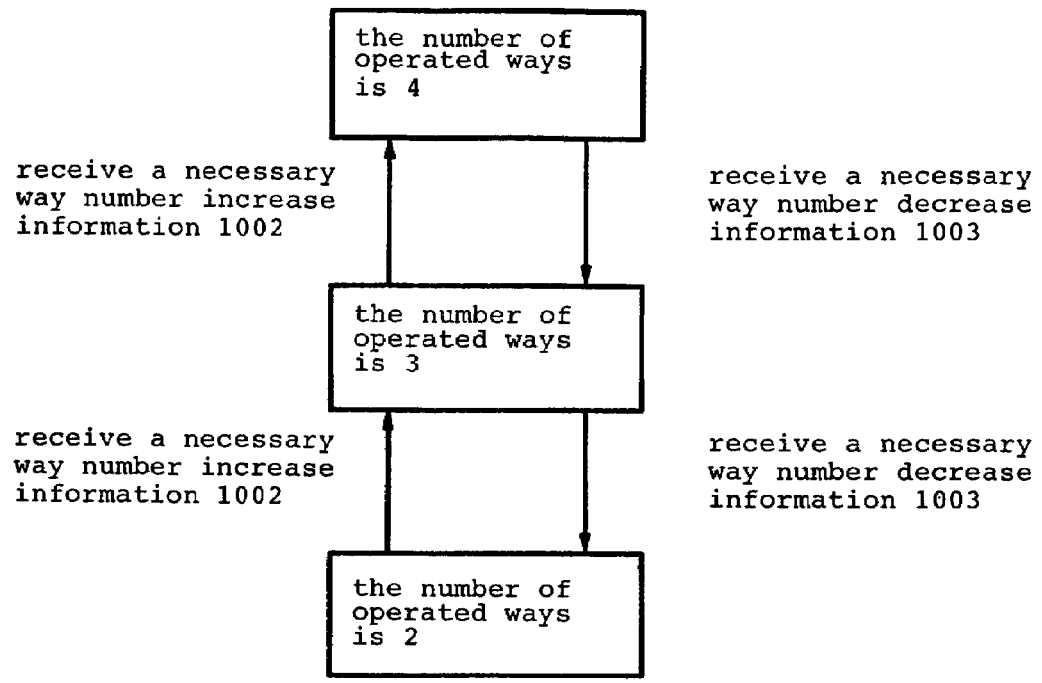
FIG. 17 is a view for explaining the operation of the way number control unit in the fourth embodiment.

FIG. 17 is a view for explaining the operation of way number control unit 4 in the fourth embodiment. Way number control unit 4 increases or decreases the number of operated ways in accordance with necessary way number increase information 1002 or necessary way number decrease information 1003 from necessary way number prediction unit 3.

Then, as shown in the upper section of FIG. 17, when the number of operated ways is 4, way number control unit 4 does not send way-32 halt information 1005 to way 32, and further, does not send way-33 halt information 1006 to way 33.

As shown in the middle section of FIG. 17, when the number of operated ways is 3, way number control unit 4 sends way-33 halt information 1006 to way 33 and halts the supply of power and clocks to way 33.

As shown in the lower section of FIG. 17, when the number of operated ways is 2, way number control unit 4 sends way-32 halt information 1005 to way 32, sends way-33 halt information 1006 to way 33, and thus halts the supply of power and clocks to ways 32 and 33.

As described in the foregoing explanation, according to the present embodiment, necessary way number prediction unit 3 does not directly use the way number increase/decrease information from way number increase/decrease determination unit 2 in controlling the number of operated ways, but rather, holds a plurality of states for determining the increase or decrease of the number of operated ways and then uses the way number increase/decrease information from way number increase/decrease determination unit 2 for state transitions. As a result, the control of the number of operated ways is implemented after first establishing whether the instructions of the way number increase/decrease information from way number increase/decrease determination unit 2 are temporary or not, whereby unnecessary increases or decreases of the number of ways caused by temporary behavior of the program can be suppressed and a reduction of the power consumption can be realized while improving the cache performance.

In addition, because the state transitions are realized through the use of an asymmetric counter and the number of operated ways is controlled in accordance with these states, appropriate state transition rules can be used for each of state transitions for increasing or decreasing the number of operated ways; and because state transitions are appropriate to the characteristics of the program or design policy, a balance can be effectively achieved between cache performance and power consumption.

Figure 18:
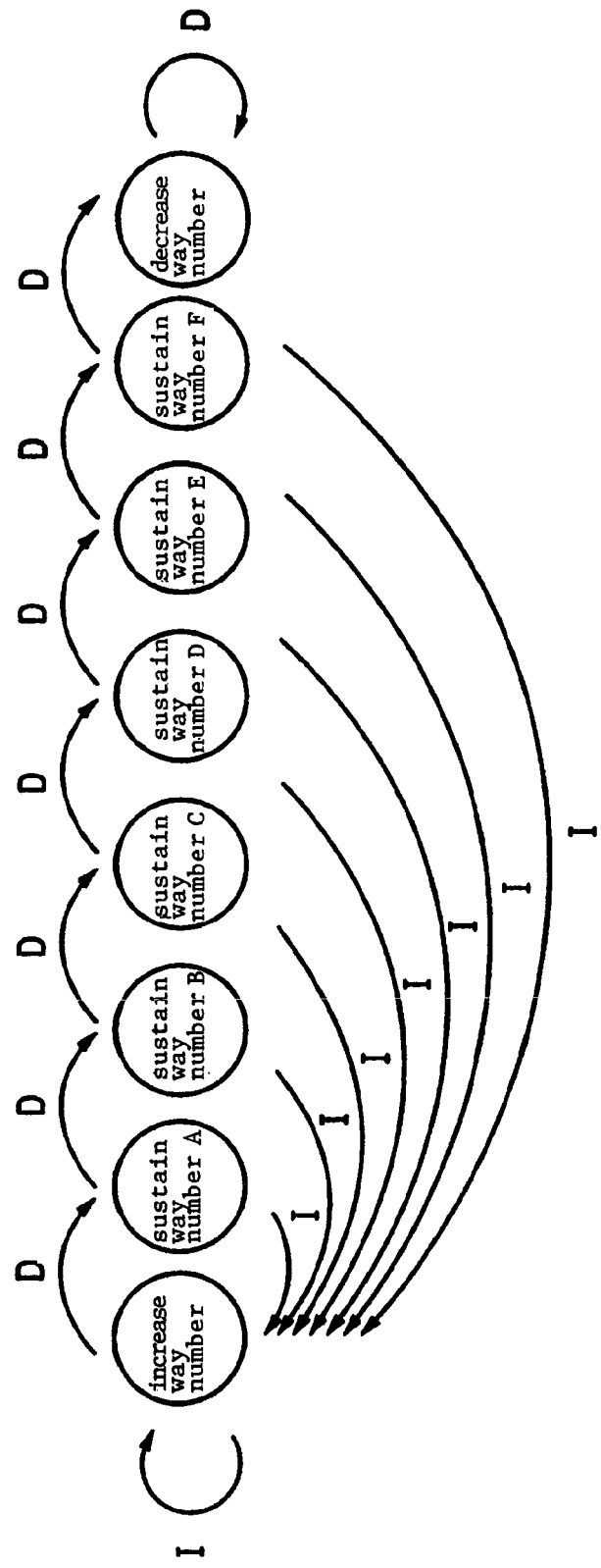
FIG. 18 shows an example of a state transition diagram that uses a 3-bit counter.

Although a case was here presented in which four states were handled by a two-bit counter, the present invention is not limited to this form. FIG. 18 shows an example of a state transition diagram that employs a three-bit counter. According to FIG. 18, as many as six sustain states "sustain way number A-F" are included, whereby the effect of temporary behavior can be more strongly suppressed and a more careful determination realized regarding decrease of the number of operated ways than in the configuration shown in FIG. 15.

Figure 19:
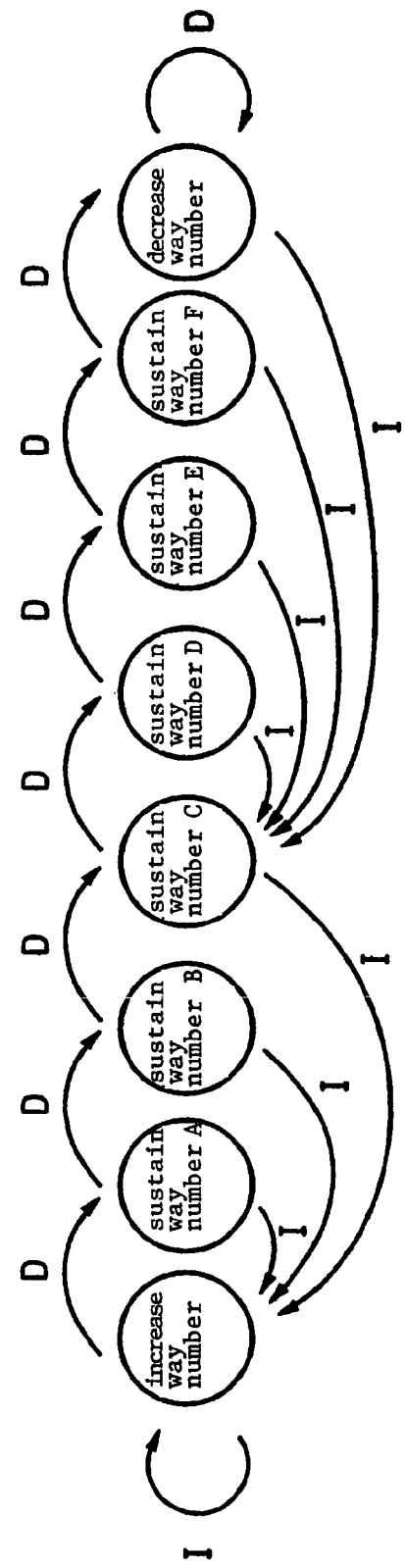
FIG. 19 shows an example of a modification of the state transition of FIG. 18.

In addition, although transition was made to the "increase way number" state from all states upon receiving way number increase information 1000, the present invention is not limited to this form. Even for a state transition toward increase, the transition may be realized by way of one or more "sustain way number" states. FIG. 19 shows a modification of the state transitions of FIG. 18. For example, as shown in FIG. 19, a transition may be made to a "sustain way number C" state upon receiving way number increase information 1000 in any of "sustain way number D-F" or "decrease way number" states, and a transition may be made to the "increase way number" state upon receiving way number increase information 1000 in any of the "sustain way number A-C" or "increase way number" states. Further, any state transition rules may be adopted according to the characteristics of the program or the design policy.

Further, contrary to the example shown here, state transition rules may also be used that realize more cautious determination for increases in the number of operated ways.

Figure 20:
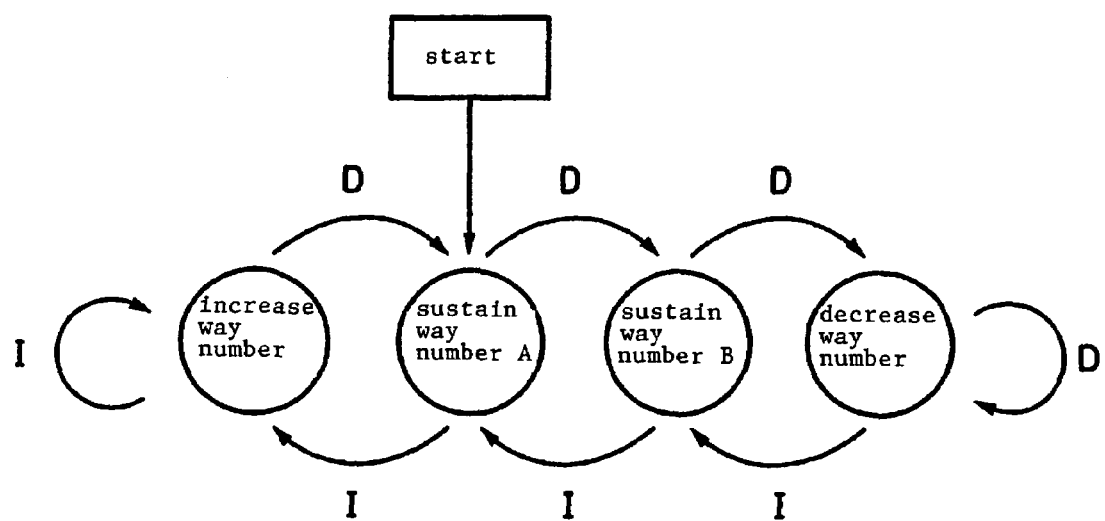
FIG. 20 shows an example of the state transition diagram that uses a symmetric counter.

Still further, any natural number of states can be handled by an asymmetric counter, and as an example, five states may be handled. In addition, although a case is here described as a typical example in which state transitions are handled by an asymmetric counter, state transitions that are handled by a symmetric counter may also be adopted as a special case when appropriate. FIG. 20 shows an example of a state transition diagram that uses a symmetric counter. State transitions by means of a symmetric counter as shown in FIG. 20 may be adopted if it is appropriate to implement state transitions with the same degree of care for increase and decrease.

Although a case was here presented in which the determination results of way number increase/decrease determination unit 2 were corrected by necessary way number prediction unit 3, the present invention is not limited to this form. The correction by necessary way number prediction unit 3 can be widely applied to determination results that are affected by temporary behavior of the program when determining increase or decrease of the number of operated ways. For example, correction by necessary way number prediction unit 3 can be applied to the determination results for determining increase or decrease of the number of operated ways that are based on the cache miss rate.

While preferred embodiments of the present invention have been described using specific terms, such description is for illustrative purposes only, and it is to be understood that changes and variations may be made without departing from the spirit or scope of the following claims.

What is claimed is:

1. A set-associative cache memory, comprising:
   a plurality of ways, each of which can be selectively operated or halted;
   a hit determination unit for determining hit ways for which cache access hits have occurred;
   a way number increase/decrease determination unit for: managing, for each of the ways that are being operated, the order of ways beginning from the way for which the time of use is most recent to the way for which the time of use is oldest; finding the order of said hit ways that have been obtained by said hit determination unit; counting the number of hits for each rank of said order; and determining increase or decrease of the number of operated ways based on an access pattern that is indicated by the relation of the number of hits for each of said ranks in said order; and
   a way number control unit for selecting operation or halting of operation of each of said ways according to the determination to increase or decrease the number of operated ways.

2. A cache memory according to claim 1, wherein said way number increase/decrease determination unit uses an appraisal value, which is obtained by dividing the number of hits for the way for which the time of use is oldest by the number of hits for the way for which the time of use is most recent, to determine said access pattern.

3. A cache memory according to claim 2, wherein said way number increase/decrease determination unit decreases said number of operated ways when said appraisal value is smaller than a first threshold value, and increases said number of operated ways when said appraisal value is greater than a second threshold value.

4. A cache memory according to claim 3, wherein at least one of said first threshold value and said second threshold value can be altered according to the program that is being executed.

5. A cache memory according to claim 3, wherein at least one of said first threshold value and said second threshold value can be altered according to the current number of operated ways.

6. A cache memory according to claim 3, wherein said first threshold value and said second threshold value are the same value.

7. A cache memory according to claim 3, wherein: said way number increase/decrease determination unit is provided with: an MRU counter for counting the number of hits for the way for which the time of use is most recent, and an LRU counter for counting the number of hits for the way for which the time of use is the oldest; and
   when the value of said MRU counter reaches a prescribed value, said way number increase/decrease determination unit compares a third threshold value that is obtained by multiplying said first threshold value by said prescribed value and a fourth threshold value that is obtained by multiplying said second threshold value by said prescribed value with the value of said LRU counter to determine increase or decrease of said number of operated ways.

8. A cache memory according to claim 7, wherein said prescribed value can be altered according to the program that is being executed.

9. A cache memory according to claim 7, wherein said prescribed value can be altered according to the current number of operated ways.

10. A cache memory according to claim 3, wherein: said way number increase/decrease determination unit is provided with an MRU counter for counting the number of hits for the way for which the time of use is most recent, and a LRU counter for counting the number of hits for the way for which the time of use is the oldest; and
    at a prescribed determination timing, said way number increase/decrease determination unit compares a fifth threshold value that is obtained by multiplying said first threshold value by the value of said MRU counter and a sixth threshold value that is obtained by multiplying said second threshold value by the value of said MRU counter with the value of said LRU counter to determine increase or decrease of said number of operated ways.

11. A cache memory according to claim 10, wherein said way number increase/decrease determination unit is provided with a hit number counter for counting the number of cache access hits; and wherein said way number increase/decrease determination unit takes the time when the value of said hit number counter reaches a prescribed value as said determination timing.

12. A cache memory according to claim 11, wherein said prescribed value can be altered according to the program that is being executed.

13. A cache memory according to claim 11, wherein said prescribed value can be altered according to the current number of operated ways.

14. A cache memory according to claim 10, wherein said way number increase/decrease determination unit is further provided with an access counter for counting the number of instances of cache access; and wherein said way number increase/decrease determination unit takes the time when the value of said access counter reaches a prescribed value as said determination timing.

15. A cache memory according to claim 14, wherein said prescribed value can be altered according to the program that is being executed.

16. A cache memory according to claim 14, wherein said prescribed value can be altered according to the current number of operated ways.

17. A cache memory according to claim 1, wherein said way number increase/decrease determination unit determines said access pattern based on the number of hits for all said ranks of said order.

18. A cache memory according to claim 1, further comprising a necessary way number prediction unit that, for the increase or decrease of said number of operated ways, includes a plurality of states that are managed using counters; implements state transitions in accordance with the determination result for increase or decrease of the number of operated ways in said way number increase/decrease determination unit, and instructs said way number control unit to increase or decrease said number of operated ways according to the state following a state transition.

19. A cache memory according to claim 18, wherein: said necessary way number prediction unit includes at least one "sustain way number" state between an "increase way number" state for actually increasing the number of operated ways and a "decrease way number" state for actually decreasing the number of operated ways; and said necessary way number prediction unit, by implementing a state transition toward increasing the number of operated ways if said determination result of said way number increase/decrease determination unit is for increasing the number of operated ways and implementing a state transition toward decreasing the number of operated ways if said determination result of said way number increase/decrease determination unit is for decreasing the number of operated ways, makes transitions between said "increase way number" state and said "decrease way number" state.

20. A cache memory according to claim 19, wherein said counter that is used by said necessary way number prediction unit is asymmetric, and wherein the number of count steps toward increasing said number of operated ways is less than the number of count steps toward decreasing said number of operated ways.

21. A cache memory that is a set-associative cache memory; comprising:
a plurality of ways, each of which can be selectively operated or halted;
a way number increase/decrease determination unit for determining increase or decrease of the number of operated ways according to the behavior of cache access of a program;
a necessary way number prediction unit that, for increase or decrease of said number of operated ways, includes a plurality of states that are managed using a counter, that implements state transitions in accordance with the determination result for increase or decrease of the number of operated ways in said way number increase/decrease determination unit, and that determines increase or decrease of said number of operated ways according to the state following a state transition; and
a way number control unit for selecting operation or halting of each of said ways according to the determination to increase or decrease said number of operated ways that is determined by said necessary way number prediction unit.

22. A cache memory according to claim 21, wherein: said necessary way number prediction unit includes at least one "sustain way number" state between an "increase way number" state for actually increasing the number of operated ways and a "decrease way number" state for actually decreasing the number of operated ways; and said necessary way number prediction unit, by implementing a state transition toward increasing the number of operated ways if said determination result of said way number increase/decrease determination unit is for increasing the number of operated ways and implementing a state transition toward decreasing the number of operated ways if said determination result of said way number increase/decrease determination unit is for decreasing the number of operated ways, makes transitions between said "increase way number" state and said "decrease way number" state.

23. A cache memory according to claim 22, wherein said counter that is used by said necessary way number prediction unit is asymmetric, and wherein the number of count steps toward increasing said number of operated ways is less than the number of count steps toward decreasing said number of operated ways.

24. A cache control method for controlling a set-associative cache memory that is provided with a plurality of ways that can each be selectively operated or halted, said method comprising steps of:
managing the order for each of ways that are in operation from the way for which the time of use was most recent to the way for which the time of use was oldest; finding the rank of a hit way in said order, said hit way being a way for which a cache hit has occurred, and counting the number of hits for each rank of said order;
determining increase or decrease of the number of operated ways based on an access pattern that is indicated by the relation of the number of hits for each of said ranks in said order;
selecting the operation or halting of operation of each of said ways according to the determination of increase or decrease of the number of operated ways.

25. A cache control method according to claim 24, wherein an appraisal value that is obtained by dividing the number of hits for the way of the rank for which the time of use is oldest by the number of hits for the way of the rank for which the time of use is most recent to determine said access pattern.

26. A cache control method according to claim 25, wherein said number of operated ways is decreased when said appraisal value is smaller than a first threshold value, and said number of operated ways is increased when said appraisal value is greater than a second threshold value.

27. A cache control method according to claim 26, wherein at least one of said first threshold value and said second threshold value can be altered according to the program that is being executed.

28. A cache control method according to claim 26, wherein at least one of said first threshold value and said second threshold value can be altered according to the current number of operated ways.

29. A cache control method according to claim 26, wherein said first threshold value and said second threshold value are the same value.

30. A cache control method according to claim 26, wherein: an MRU counter that counts the number of hits for the way of the rank for which the time of use is most recent and an LRU counter that counts the number of hits for the way of the rank for which the time of use is oldest are used; and when the value of said MRU counter reaches a prescribed value, a third threshold value that is obtained by multiplying said first threshold value by said prescribed value and a fourth threshold value that is obtained by multiplying said second threshold value by said prescribed value are compared with the value of said LRU counter to determine increase or decrease of said number of operated ways.

31. A cache control method according to claim 30, wherein said prescribed value can be altered in accordance with the program that is being executed.

32. A cache control method according to claim 30, wherein said prescribed value can be altered in accordance with the current number of operated ways.

33. A cache control method according to claim 26, wherein: an MRU counter that counts the number of hits for the way of the rank for which the time of use is most recent and an LRU counter that counts the number of hits for the way of the rank for which the time of use is oldest are used; and at a prescribed determination timing, a fifth threshold value that is obtained by multiplying said first threshold value by the value of said MRU counter and a sixth threshold value that is obtained by multiplying said second threshold value by the value of said MRU counter are compared with the value of said LRU counter to determine increase or decrease of said number of operated ways.

34. A cache control method according to claim 33, wherein a hit number counter for counting the number of cache access hits is used, and wherein the time that the value of said hit number counter reaches a prescribed value is taken as said determination timing.

35. A cache control method according to claim 34, wherein said prescribed value can be altered according to the program that is being executed.

36. A cache control method according to claim 34, wherein said prescribed value can be altered according to the current number of operated ways.

37. A cache control method according to claim 33, wherein an access counter for counting the number of instances of cache access is used, and wherein the time that the value of said access counter reaches a prescribed value is taken as said determination timing.

38. A cache control method according to claim 37, wherein said prescribed value can be altered according to the program that is being executed.

39. A cache control method according to claim 37, wherein said prescribed value can be altered according to the current number of operated ways.

40. A cache control method according to claim 24, wherein said way number increase/decrease determination unit determines said access pattern based on the number of hits for all ranks of said order.

41. A cache control method according to claim 24, wherein: for increase and decrease of said number of operated ways; a plurality of states are included that are managed using a counter;

state transitions are implemented in accordance with determination results of increase or decrease of said number of operated ways; and increase or decrease of said number of operated ways is determined in accordance with the state that follows a state transition.

42. A cache control method according to claim 41, wherein:

at least one "sustain way number" state is created between an "increase way number" state for actually increasing the number of operated ways and a "decrease way number" state for actually decreasing the number of operated ways; and by implementing a state transition toward increasing the number of operated ways if said determination result is for increasing the number of operated ways and implementing a state transition toward decreasing the number of operated ways if said determination result is for decreasing the number of operated ways, transitions are implemented between said "increase way number" state and said "decrease way number" state.

43. A cache control method according to claim 42, wherein said counter is asymmetric, and the number of count steps toward increase of said number of operated ways is less than the number of count steps toward decreasing said number of operated ways.

44. A cache control method for controlling a set-associative cache memory that is provided with a plurality of ways that each can be selectively operated or halted, said method comprising steps of:

determining increase or decrease of the number of operated ways according to the behavior of cache access of a program;

for increase and decrease of said number of operated ways, using a plurality of states that are managed using a counter, implementing state transitions according to the determination results of increase or decrease of said number of operated ways, and determining increase or decrease of said number of operated ways according to the state that follows a state transition; and selecting the operation or halt of operation of each of said ways according to the determination to increase or decrease the number of operated ways.

45. A cache control method according to claim 44, wherein:

at least one "sustain way number" state is created between an "increase way number" state for actually increasing the number of operated ways and a "decrease way number" state for actually decreasing the number of operated ways; and by implementing a state transition toward increasing the number of operated ways if said determination result is for increasing the number of operated ways and implementing a state transition toward decreasing the number of operated ways if said determination result is for decreasing the number of operated ways, transitions are implemented between said "increase way number" state and said "decrease way number" state.

46. A cache control method according to claim 45, wherein said counter is asymmetric, and wherein the number of count steps toward increase of said number of operated ways is less than the number of count steps toward decrease of said number of operated ways.

* * * * *